(12) United States Patent
Lee et al.

(10) Patent No.: US 11,200,424 B2
(45) Date of Patent: Dec. 14, 2021

(54) SPACE-TIME MEMORY NETWORK FOR LOCATING TARGET OBJECT IN VIDEO CONTENT

(71) Applicant: Adobe Inc., San Jose, CA (US)

(72) Inventors: Joon-Young Lee, Milpitas, CA (US); Ning Xu, Milpitas, CA (US); Seoungwug Oh, Seoul (KR)

(73) Assignee: Adobe Inc., San Jose, CA (US)

( * ) Notice: Subject to any disclaimer, the term of this patent is extended or adjusted under 35 U.S.C. 154(b) by 175 days.

(21) Appl. No.: 16/293,126

(22) Filed: Mar. 5, 2019

(65) Prior Publication Data

US 2020/0117906 A1 Apr. 16, 2020

Related U.S. Application Data

(60) Provisional application No. 62/744,919, filed on Oct. 12, 2018.

(51) Int. Cl.
*G06K 9/00* (2006.01)

(52) U.S. Cl.
CPC ..... *G06K 9/00744* (2013.01); *G06K 9/00758* (2013.01); *G06K 9/00765* (2013.01); *G06K 2009/00738* (2013.01)

(58) Field of Classification Search
CPC ..... G06K 9/00771; G06K 2009/00738; G06K 9/00744; G06K 9/00758; G06K 9/00765; G06T 2207/10016; G06T 2207/20084; G06T 7/194
See application file for complete search history.

(56) References Cited

U.S. PATENT DOCUMENTS

| 2014/0344195 A1* | 11/2014 | Drew | G06N 5/04 |
| | | | 706/12 |
| 2019/0043003 A1* | 2/2019 | Fisher | G01S 3/00 |
| 2019/0272315 A1* | 9/2019 | Walia | G06F 40/205 |

OTHER PUBLICATIONS

Bao, Linchao, et al., "CNN in MRF: Video Object Segmentation Via Inference in a CNN-Based Higher-Order Spatiotemporal MRF", IEEE Conference on Computer Vision and Pattern Recognition (CVPR), 2018, 10 pages.

(Continued)

*Primary Examiner* — Margaret G Mastrodonato
(74) *Attorney, Agent, or Firm* — Kilpatrick Townsend & Stockton LLP

(57) ABSTRACT

Certain aspects involve using a space-time memory network to locate one or more target objects in video content for segmentation or other object classification. In one example, a video editor generates a query key map and a query value map by applying a space-time memory network to features of a query frame from video content. The video editor retrieves a memory key map and a memory value map that are computed, with the space-time memory network, from a set of memory frames from the video content. The video editor computes memory weights by applying a similarity function to the memory key map and the query key map. The video editor classifies content in the query frame as depicting the target feature using a weighted summation that includes the memory weights applied to memory locations in the memory value map.

20 Claims, 13 Drawing Sheets
(7 of 13 Drawing Sheet(s) Filed in Color)

(56) References Cited

OTHER PUBLICATIONS

Caelles, Sergi, et al., "One-Shot Video Object Segmentation", In Proceedings of the IEEE Conference on Computer Vision and Pattern Recognition, arXiv:1611.05198v4, Apr. 13, 2017, 10 pages.
Chen, Yuhua, et al., "Blazingly Fast Video Object Segmentation With Pixel-Wise Metric Learning" Computer Vision and Pattern Recognition, 2018, 10 pages.
Cheng, Jingchun, et al., "Fast And Accurate Online Video Object Segmentation Via Tracking Parts", In IEEE Conference on Computer Vision and Pattern Recognition (CVPR), 2018, 10 pages.
Cheng, Jingchun, et al., "Segflow: Joint Learning For Video Object Segmentation And Optical Flow", Proceedings of the IEEE International Conference on Computer Vision, 2017, 10 pages.
Cheng, Ming-Ming, et al., "Global Contrast Based Salient Region Detection", IEEE Transactions on Pattern Analysis and Machine Intelligence, vol. 37, Issue 32, Mar. 2015, 8 pages.
Ci, Hai, et al., "Video Object Segmentation By Learning Location-Sensitive Embeddings", In European Conference on Computer Vision, 2018, 16 pages.
Everingham, Mark, et al., "The Pascal Visual Object Classes (VOC) Challenge", International Journal of Computer Vision, vol. 88, Issue 2, 2010, 36 pages.
Hariharan, Bharath, et al., Semantic Contours From Inverse Detectors, In Proceedings of the IEEE International Conference on Computer Vision, IEEE, 2011, 8 pages.
He, Kaiming, et al., "Deep Residual Learning For Image Recognition", In Proceedings of the IEEE Conference on Computer vision and Pattern Recognition, 2016, 9 pages.
He, Kaiming, et al., "Identity Mappings In Deep Residual Networks", In European Conference on Computer Vision, Springer, 2016, arXiv:1603.05027v3, Jul. 2018, 15 pages.
Hu, Yuan-Ting, et al., "MaskRNN: Instance Level Video Object Segmentation" In Advances in Neural Information Processing Systems, 2017 10 pages.
Hu Yuan-Ting, et al., "Videomatch: Matching Based Video Object Segmentation", In European Conference on Computer Vision, 2018, 17 pages.
Luiten, Jonathan, et al., Premvos: Proposal Generation, Refinement And Merging For The Davis Challenge On Video Object Segmentation 2018, The 2018 Davis Challenge on Video Object Segmentation—CVPR Workshops, 2018, 4 pages.
Jampani, Varun, et al., "Video Propagation Networks", Proceedings of the IEEE Conference on Computer Vision and Pattern Recognition, 2017, 11 pages.
Khoreva, Anna, et al., "Lucid Data Dreaming For Object Tracking", arXiv preprint arXiv:1703.09554, Mar. 2017, 17 pages.
Kingma, Diederik, et al., "Adam: A Method For Stochastic Optimization", In International Conference on Learning Representations, 2015, arXiv:1412.6980v9, Jan. 2017, 15 pages.
Krähenbühl, Philipp, et al., "Efficient Inference In Fully Connected CRFs with Gaussian Edge Potentials", In Advances in Neural Information Processing Systems, 2011, 9 pages.
Lee, Sangho, et al., "A Memory Network Approach For Story-Based Temporal Summarization Of 360 Videos", In IEEE Conference on Computer Vision and Pattern Recognition (CVPR), 2018, 10 pages.
Li, Xiaoxiao, et al., "Video Object Segmentation With Joint Re-Identification And Attention-Aware Mask Propagation", In European Conference on Computer Vision, 2018, 16 pages.
Lin, Tsung-Yi, et al., "Microsoft COCO: Common Objects in Context", In European Conference on Computer Vision, Springer, 2014, arXiv:1405.0312v3, Feb. 2016, 15 pages.

Liu, Rosanne, et al., "An Intriguing Failing of Convolutional Neural Networks and the Coordconv Solution", arXiv preprint arXiv:1807.03247, Dec. 2018, 26 pages.
Maninis, K.-K,. et al., "Video Object Segmentation Without Temporal Information", arXiv preprint arXiv:1709.06031, 2017 and arXiv:1709.06031v2, May 2018, 15 pages.
Marki, Nicolas, et al., "Bilateral Space Video Segmentation", In Proceedings of the IEEE Conference on Computer Vision and Pattern Recognition, 2016, 9 pages.
Miller, Alexander H., et al., "Key-Value Memory Networks For Directly Reading Documents". arXiv preprint arXiv:1606.03126, Oct. 2016, 10 pages.
Oh, Seoung Wug, et al., "Fast Video Object Segmentation By Reference-Guided Mask Propagation", In The IEEE Conference on Computer Vision and Pattern Recognition (CVPR), 2018, 10 pages.
Park, CSC Chunseong, et al., "Attend To You: Personalized Image Captioning With Context Sequence Memory Networks", In IEEE Conference on Computer Vision and Pattern Recognition (CVPR), IEEE, 2017, 9 pages.
Perazzi, Federico, et al., "Learning Video Object Segmentation From Static Images" In Proceedings of the IEEE Conference on Computer Vision and Pattern Recognition, 2017, 10 pages.
Perazzi, F, et al., "A Benchmark Dataset And Evaluation Methodology For Video Object Segmentation", In Proceedings of the IEEE Conference on Computer Vision and Pattern Recognition, 2016, 9 pages.
Pont-Tuset, Jordi, et al., The 2017 Davis Challenge on Video Object Segmentation, arXiv:1704.00675, 2017, arXiv:1704.00675v3, Mar. 2018, 6 pages.
Shi, Jianping, et al., "Hierarchical Image Saliency Detection On Extended CSSD", IEEE Transactions on Pattern Analysis and Machine Intelligence, vol. 38, Issue 4, 2016, arXiv:1408.5418v2, Aug. 2015 14 pages.
Sukhbaatar, Sainbayar, et al., "End-To-End Memory Networks", In Advances in Neural Information Processing Systems, 2015, 9 pages.
Tsai, Yi-Hsuan, et al., "Video Segmentation Via Object Flow", In Proceedings of the IEEE Conference on Computer Vision and Pattern Recognition, 2016, 10 pages.
Voigtlaender, Paul, et al., "Online Adaptation Of Convolutional Neural Networks For Video Object Segmentation", In British Machine Vision Conference, 2017, arXiv:1706.09364v2, Aug. 2917, 16 pages.
Wang, Xiaolong, et al., "Non-Local Neural Networks", In IEEE Conference on Computer Vision and Pattern Recognition (CVPR), 2018, 10 pages.
Xu, Ning, et al., "Youtube-VOS: Sequence-To Sequence Video Object Segmentation", In European Conference on Computer Vision, 2018, 17 pages.
Yang, Jimei, et al., Weakly Supervised Disentangling With Recurrent Transformations For 3d View Synthesis, In Advances in Neural Information Processing Systems, 2015, 9 pages.
Yang,Linjie, et al., "Efficient Video Object Segmentation Via Network Modulation", In IEEE Conference on Computer Vision and Pattern Recognition (CVPR), 2018, 9 pages.
Yoon, Jae Shin, et al., "Pixel-Level Matching For Video Object Segmentation Using Convolutional Neural Networks", In Proceedings of the IEEE International Conference on Computer Vision, 2017, 10 pages.
Yang, Tianyu, et al., "Learning Dynamic Memory Networks for Object Tracking", In Proceedings of the European Conference on Computer Vision (ECCV), Sep. 8-14, 2018, pp. 152-167.
Hu, Yuan-Ting, et al., "MaskRNN: Instance Level Video Object Segmentation", arXiv preprint arXiv: 1803.11187. Available at URL: https://arxiv.org/pdf/1803.11187.pdf, Mar. 29, 2018, pp. 1-10.
Examination Report from related Australian Application No. 2019213369 dated Oct. 12, 2021, pp. 1-7.

* cited by examiner

| | F | L | FL | 3 | 5 | 10 | 15 | 20 | 30 |
|---|---|---|---|---|---|---|---|---|---|
| 𝒥 | 81.4 | 83.2 | 87.8 | 88.6 | 88.7 | 88.6 | 88.7 | 88.0 | 88.0 |
| ℱ | 82.9 | 83.3 | 89.1 | 89.7 | 89.9 | 89.8 | 90.0 | 89.2 | 89.3 |
| T(s) | 0.06 | 0.06 | 0.07 | 0.24 | 0.16 | 0.13 | 0.11 | 0.10 | 0.08 |

FIG. 13

SPACE-TIME MEMORY NETWORK FOR LOCATING TARGET OBJECT IN VIDEO CONTENT

CROSS REFERENCE TO RELATED APPLICATIONS

This disclosure claims priority to U.S. Provisional Application No. 62/744,919, filed on Oct. 12, 2018, which is hereby incorporated in its entirety by this reference.

TECHNICAL FIELD

This disclosure relates generally to automated processing of video content for video playback systems. More specifically, but not by way of limitation, this disclosure relates to using a space-time memory network to locate one or more target objects in video content for segmentation or other object classification that facilitates video editing.

BACKGROUND

Video editing applications that enhance video content with different visual effects are receiving more demand due to the popularity of shared video content on the Internet. Automatic video editing is conventionally performed with commercial interactive tools that require extensive time for novice users to use effectively. In a video editor, a user may wish to add one or more visual effects to a video, such as changing the color of the background, changing the color of the foreground, adding artwork, etc. Video editing can involve identifying a target feature to be edited across multiple frames, that will remain unchanged across multiple frames, or some combination thereof. In one example, video editing could involve separating foreground pixels from background pixels. This separation of foreground and background pixels is often a preliminary step for other video edits, such as manipulating objects' color and adding visual effects (e.g., segmenting a foreground object to be edited from background content that may be discarded or remain unchanged). For instance, Adobe® After Effects CC provides a "RotoBrush" tool that is used for video object segmentation.

However, existing video editors often require extensive user interactions that can prove tedious and laborious when selecting a target object in video frames. For instance, a video editor tool (e.g., RotoBrush) can be used to select a target object in one frame and populate the selection of the same target object to neighboring frames. But the segmentation mask applied to the target object in a first frame may be inaccurate with respect to the target object as depicted in the second frame. For instance, if the target object's position or orientation changes too much between the first and second frames, the segmentation mask that is automatically populated to the second frame may fail to encompass portions of the target object, may encompass objects other than the target object, or both.

Conventional methods for classifying a feature in a video (e.g., segmenting a foreground object from the background content) rely on either using an object classification in a first frame to detect the object in other frames (e.g., using a first frame's mask to detect an segmentation mask of other frames) or propagating a previous object classification (e.g., a prior frame's mask) to subsequent frames. However, these approaches could have limitations in adapting to changes in the appearance of a target object across frames or preventing drifts. In an example involving segmentation, if a mask-estimation method relies too heavily on the mask of a first frame to detect a target object in other frames, changes in appearance with respect to the target object could reduce the accuracy of segmentation masks in other frames. In another example involving propagation of a previous frame's mask, appearance changes of a target object could be tracked, but error accumulation could result in a large drift of a tracked mask. For instance, propagated masks may smear to the background or shrink, which can cause the propagated masks to track regions or objects other than the desired target object.

Some existing techniques, such as online learning methods, address these issues by using trained neural network models to automatically perform classification tasks (e.g., segment foreground and background pixels) in video frames. In one example, online learning methods can use an initial classification task (e.g., applying a segmentation mask) in the first frame and can fine-tune deep network models to remember the appearance of the target object or feature. In these methods, a learning process for a deep network model is performed with only one data sample, i.e., the first frame of a set of video frames.

Online learning methods can be further grouped into detection-based methods and propagation-based methods. In an example involving a detection-based segmentation, a neural network model includes an object-specific detector that independently processes each video frame to segment out the target object. In an example involving a propagation-based segmentation, a neural network is trained to propagate segmentation masks using temporal consistency. Propagation-based methods learn an object-specific mask propagator (e.g., a deep network) that refines a misaligned mask toward a target object. Simulation training data, which is used for this learning task, is generated from the first frame of video by deforming an segmentation mask or synthesizing images to learn mask propagators.

However, online learning methods can be computationally expensive. For instance, the online learning requires at least some online training. For instance, if a video editor uses online learning methods to perform object segmentation or other classification, at least some training iterations occur at test time (i.e., in an end-user case). These online training iterations increase the computational resources required for the editing process and decrease responsiveness of the video editor. These computational and responsiveness issues can be unsuitable for interactive editing platforms.

SUMMARY

Certain aspects involve using a space-time memory network to locate one or more target objects in video content for segmentation or other object classification. In one example, a video editor generates a query key map and a query value map by applying a space-time memory network to features of a query frame from video content. The video editor retrieves a memory key map and a memory value map that are computed from a set of memory frames from the video content. The video editor computes memory weights by applying a similarity function to the memory key map and the query key map. The video editor classifies content in the query frame as depicting the target feature using a weighted summation that includes the memory weights applied to memory locations in the memory value map.

BRIEF DESCRIPTION OF THE DRAWINGS

Features, aspects, and advantages of the present disclosure are better understood when the following Detailed Description is read with reference to the accompanying drawings.

The patent or application file contains at least one drawing executed in color. Copies of this patent or patent application publication with color drawing(s) will be provided by the Office upon request and payment of the necessary fee.

FIG. 13 depicts a table with examples of results obtained using different memory management rules used by certain aspects described herein.

DETAILED DESCRIPTION

Figure 1:
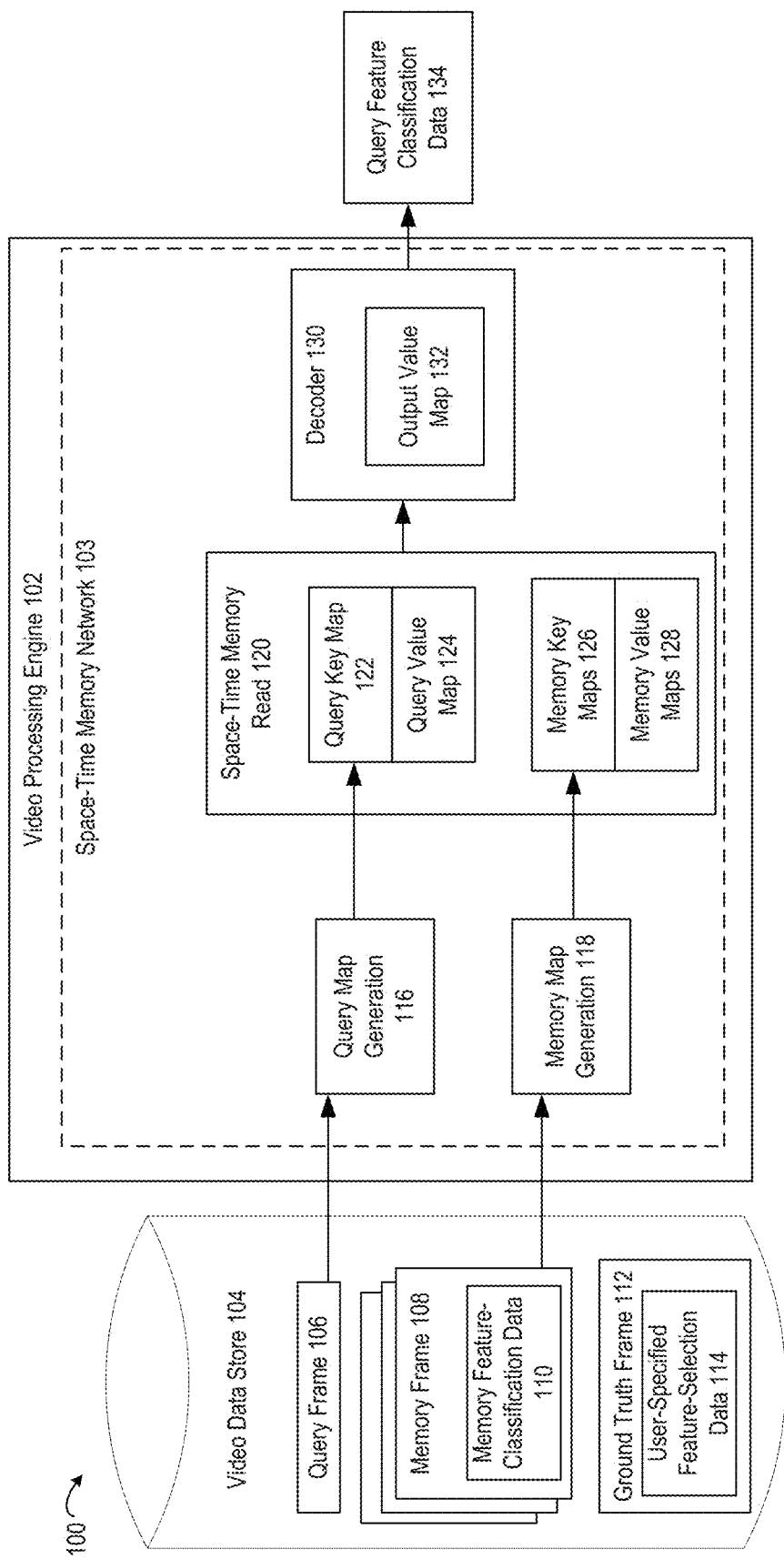
FIG. 1 depicts an example of a video processing environment for memory-based segmentation or other video processing, according to certain aspects of this disclosure.

Certain aspects involve using a space-time memory network to locate one or more target objects in video content for segmentation or other object classification. For instance, a video editor that uses the space-time memory network receives a selection of a target feature in one frame of video and automatically classifies, via a space-time memory network applied to a query frame and one or more memory frames, one or more portions of one or more other frames of the video as having that target feature. The space-time memory network incorporates external memory storage for storing classification data with respect to memory frames (e.g., a segmentation mask applied to a target object in a memory frame). In some aspects, leveraging the guidance provided by this stored classification data can avoid the inefficient utilization of computing resources that is present in online learning methods. In additional or alternative aspects, the space-time memory network can provide greater flexibility than existing memory networks that could be used for object segmentation or other classification tasks.

The following non-limiting example is provided to introduce certain aspects. In this example, a video editor with access to a space-time memory network is used to perform one or more feature-classification operations on video content, such as segmentation of one or more target objects. The video editor receives or otherwise accesses a query frame of the video content. The query frame includes visual content depicting a target feature, such as a target object (e.g., a person wearing a suit) that may be displayed with background content (e.g., a busy street on which the person is standing). The video editor performs the classification task by applying the space-time memory network to the query frame. For instance, the video editor generates, for the query frame, a query key map and a query value map by applying one or more encoders and one or more embedding layers of the space-time memory network to features of the query frame. The query key and query value map can be used to implement a space-time memory read operation in which the video editor classifies, based at least partially on classification information (e.g., segmentation data) from stored memory frames, content in the query frame as having a target feature.

To perform the space-time memory read operation, the video editor retrieves, from a memory, a memory key map and a memory value map. Each of the memory key map and the memory value map are computed from a set of memory frames of the video content. Memory frames are frames to which the space-time memory network has previously been applied to generate feature-classification data. In an example involving segmentation, memory frames are video frames for which segmentation masks of a target object have been computed with the space-time memory network, whereas a query frame lacks a segmentation mask for the target object. The memory frames can be generated, at least in part, on user inputs that manually identify a target feature. For instance, at least one of the memory frames includes a first selection of the target feature (e.g., a segmentation mask) that is computed by the space-time memory network based on a user-specified selection of the target feature in a ground truth frame of the video content (e.g., a user-specified segmentation mask in an initial video frame) and another selection of the target feature computed for a different memory frame (i.e., an automatically generated segmentation mask for a video frame following the initial video frame).

Continuing with this example, the video editor computes memory weights from the memory key map and the query key map. For instance, the space-time memory read operation can include executing a similarity function that measures similarities between pairs of entries in the memory key map and the query key map. The memory weights can represent the computed similarities. The video editor applies these memory weights, which are computed from the key maps, to the query and memory value maps and thereby performs the object classification operation. For instance, the space-time memory read operation includes a weighted summation in which the memory weights are applied to memory locations in the memory value map. The weighted summation can be used to classify certain content in the query frame as having the target feature. In an example involving segmentation, the weighted summation is concatenated with a query value map, and the result of the concatenation is decoded into a segmentation mask for the query frame. In this manner, both the segmentation masks for other video frames and similarities between the query frame content and memory frames' content are used to construct an accurate segmentation mask for the query frame.

Example of an Operating Environment for Memory-Based Video Feature Classification Referring now to the drawings, FIG. 1 depicts an example of a video editing environment 100 for memory-based segmentation or other video processing. The video editing environment 100 includes a video processing engine 102, which can be executed on one or more computing devices, and a video data store 104. The video processing engine 102 can be included in or accessible to a video editor, which can add one or more visual effects to a video, such as changing the color of the background, changing the color of the foreground, adding artwork, etc. Video editing can involve identifying a target feature to be edited across multiple frames, that will remain unchanged across multiple frames, or some combination thereof. In one example, video editing could involve separating foreground pixels from background pixels. This separation of foreground and background pixels is often a preliminary step for other video edits, such as manipulating objects' color and adding visual effects (e.g., segmenting a foreground object to be edited from background content that may be discarded or remain unchanged).

The video editing environment 100 can identify these target features for editing in one or more video frames. To do so, the video editing environment 100 can implement certain aspects that involve offline learning. For instance, the video editing environment 100 can use multiple previous frames, such as memory frames 108, as guidance when performing video processing operations on a query frame 106.

In the video editing environment 100, the video processing engine uses a space-time memory network 103. The space-time memory network 103 is a neural network model that has been trained to read relevant information from the memory frames 108 for computing the query feature-classification data 134. The memory frames 108 can are frames from video content for which memory feature-classification data 110 has been computed. The space-time memory network 103 is used to compute query feature-classification data 134 for a query frame 106. A query frame 106 can be a frame of the video content having content that may or may not depict a target feature or object. In one example, a query frame 106 includes content depicting a target feature or object, but lacks data classifying that content as depicting the target feature or object. The space-time memory network 103 can be a neural network model having external memory storage (e.g., the video data store 104) to which information can be written and from which information can be read.

In one example involving the video editing environment 100, a video processing engine 102 uses the space-time memory network 103 to identify a target object in a "ground truth" frame based on a set of boundary clicks or other user inputs received via an input device, such as a set of boundary clicks or other user inputs received via an input device. The video processing engine 102 learns the appearance of the target feature in real time. To do so, the video processing engine 102 can perform a semi-supervised video feature classification (e.g., segmentation). The semi-supervised video object segmentation involves identifying feature classification data (e.g., a segmentation mask) for a first frame based on one or more user inputs (e.g., boundary clicks). The semi-supervised video feature classification also involves estimating the feature-classification data (e.g., segmentation masks) of other frames in the video that include the target feature of object.

The space-time memory network 103 is used to perform this semi-supervised video feature classification. For instance, one or more previous frames and their associated mask estimations are stored into an external memory (e.g., video data store 104). The external memory is accessed to compute query feature-classification data 134 (e.g., an estimated segmentation mask) of a query frame. Pixel-level memories are stored in the form of pairs of key and values vectors. The keys are used for the addressing and the values are used for the reading state to output the results. The space-time memory network 103 memory network learns to match keys to address relevant memories, and the corresponding values are combined to return outputs.

For instance, memory feature-classification data 110 can include any data indicating the presence or absence of a target feature in one or more portions of a memory frame. Query feature-classification data 134 can include any data indicating the presence or absence of a target feature in one or more portions of a query frame. For instance, feature-classification data could include a probability map. A probability map can include any suitable data structure having entries indicating the likelihood that various pixels are part of a target object or include some other target feature. One example of a data structure for a probability map is a two-dimensional matrix with entries corresponding to pixels in a digital image, wherein each entry reflects the likelihood that the corresponding pixel is part of a target object.

One example of a use case for feature-classification data is providing a segmentation mask. For instance, memory feature-classification data 110, query feature-classification data 134, or both can include data classifying one or more target objects in a frame as belonging to the foreground or the background (i.e., segmenting the frame into foreground pixels depicting one or more target objects and background pixels depicting content other than a target object).

In deep networks, the convolution operation has a limited receptive field and can mix the information in a "local" region. The space-time memory network 103 can store vectorized intermediate feature maps (i.e., the memory feature-classification data 110) into the video data store 104. The space-time memory network 103 can retrieve the vectorized intermediate feature maps globally (non-locally in space and time) by non-local matching and use the "non-local" information to segment a target object. The "non-local" matching involves matching without the matching process being temporally restricted to examining certain frames (e.g., a frame with a close time index, such as the immediately preceding frames) or being spatially restricted to examining certain regions of frames.

In one example, given user-specified feature-selection data 114 for a ground truth frame 112 (e.g., a first video frame), the video processing engine 102 uses the space-time memory network 103 to estimate query feature-classification data 134 for a target object in each query frame. In one example, video frames are sequentially processed, starting from the second frame and using a ground truth annotation applied to the first frame (i.e., the ground truth frame 112). A ground truth annotation can be, for example, an segmentation mask specified by one or more selection inputs from a user input device (e.g., mouse clicks identifying boundaries of a target object). In this example, memory frames 108 are previously processed frames (or a ground truth frame) with segmentation masks (either given at the first frame or estimated at other frames). A query frame 106 is a frame currently under consideration, i.e., a frame without a segmentation mask for the target objet.

Both the memory and the query frames are embedded into key-value pairs. For instance, in the space-time memory network 103, a query map generation operation 116 and a memory map generation operation 118 is used to encode and embed video frames into feature vectors. The feature vectors are separately embedded into key (input) and value (output) vectors. For instance, the query map generation operation 116 outputs a query key map 122 and a query value map 124. The memory map generation operation 118 outputs, for at least one memory frame 108, a corresponding memory key map 126 and a memory value map 128. Additional details of the encoding and embedding operations used to generate the key and value maps are described herein with respect to FIGS. 3 and 4.

A space-time memory read 120 uses these key-value pairs to retrieve information relevant to the query frame from the memory frames. In one example, every pixel on the key embedding maps computed from both the query frame and one or more memory frames is densely matched through the space-time memory read 120. This can allow the space-time memory network 103 to address long-ranged memories in the spatio-temporal space of a video.

A decoder 130 receives, as an input, an output value map 132 generated by the space-time memory read 120. The decoder 130 reconstructs estimated query feature-classification data 134 (e.g., a segmentation mask) for the target object in the query frame 106. Additional details of the space-time memory read 120 and the decoder operation are described herein with respect to FIGS. 3 and 5.

The memory in the space-time memory network 103 can be dynamic, as the size of the memory expands as the video processing proceeds. Target objects are segmented sequentially by frames. Newly computed segmentations masks and their associated video frames are added to the memory. These features can increase the flexibility of the system depicted in FIG. 1. These features can also make the system depicted in FIG. 1 robust, as any video frames with segmentation masks can be used as reference frames by writing these video frames into the memory. There is no limitation on the memory size as it is stored externally, separated from the network parameters. In comparison, the size of the memory in existing memory networks is fixed throughout the process.

In some aspects, using the space-time memory network 103 allows the video processing engine 102 to reduce the errors that may otherwise occur (i.e., in existing segmentation techniques) if a segmentation mask is automatically populated across multiple frames. For instance, the space-time memory network 103 can be trained to read relevant information from an external memory (e.g., the video data store 104), which is built from one or more annotated frames having segmentation masks or other feature classification data, to classify a query frame as having a certain target feature (e.g., reconstruct or otherwise compute a segmentation mask for a target object in a query frame). Memory reading is performed during a forward pass, which can reduce the need for online fine-tuning. A video editor having the video processing engine 102 can allow an end user to refine errors that may still occur (e.g., via additional user inputs modifying one or more portions of the segmentation mask), though these errors may be less severe than what would occur in the absence of the video processing engine.

In additional or alternative aspects, the video processing engine 102 depicted in FIG. 1 can perform feature-classification operations (e.g., segmentation) that are robust to appearance changes or drifting. The space-time memory network 103 can flexibly adapt to the appearance of objects changing over time by writing the intermediate frame's results onto the memory. For instance, online learning is employed for letting a network understand possible appearance variations of a target object so that the network can handle appearance changes of a target object. By contrast, the space-time memory network 103, which uses offline learning, can keep a track of feature-classification data (e.g., foreground and background information) in the memory and use the information by retrieving relevant information in the memory. In some aspects, instead of training a memory network for the possible input variations at the testing time, the memory network learns how to retrieve relevant information, which is generalizable, and can therefore handle appearance changes without online learning.

As described above, previous methods use information provided by past frames in a manner that is either inefficient (e.g., by relying on online training) or inflexible by being restricted to accessing only the first and last frames by the network structure. Some aspects described herein can avoid one or more of these disadvantages. For instance, certain aspects use a space-time memory network 103 that does not require online training. Additional or alternative aspects provide flexibility, as any video frames with feature-classification data (e.g., segmentation masks) can be used for reference by writing them into the memory. Writing new memory can be performed with a tensor concatenation. Structural limitations on the memory size can be avoided. Thus, certain implementation described herein use a space-time memory network that can be dynamically reinforced during a video processing by writing intermediate results into the memory.

Example of a Process for Memory-Based Video Feature Classification

Figure 2:
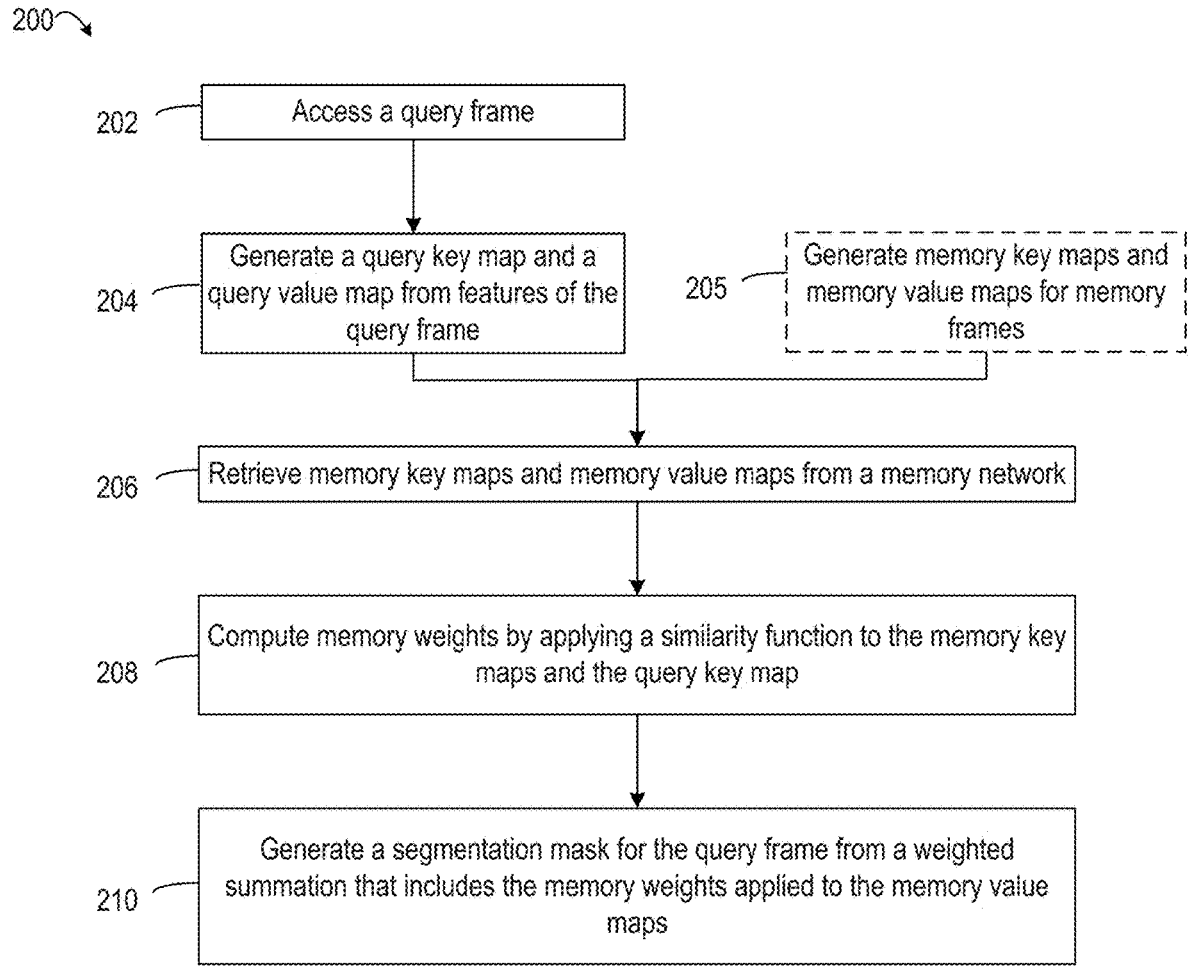
FIG. 2 depicts an example of a process for performing memory-based video feature classification, according to certain aspects of this disclosure.

FIG. 2 depicts an example of a process 200 for performing memory-based video feature classification. One or more operations described with respect to FIGS. 2-6 can be used to implement a step for classifying content of a query frame as depicting a target feature by applying a space-time memory network to the query frame and one or more memory frames. In some aspects, one or more computing devices implement operations depicted in FIG. 2 by executing suitable program code (e.g., the video processing engine 102). For illustrative purposes, the process 200 is described with reference to certain examples depicted in the figures. Other implementations, however, are possible.

At block 202, the process 200 involves accessing, from video content, a query frame having content depicting a target feature. For example, the video processing engine 102 can access video content from a video data store 104, which can be located on one or more memory devices available over a data network, one or more memory devices connected to a data bus on a computing device that executes the video processing engine 102, or some combination thereof.

The video content can include a ground truth frame 112 that includes or is associated with user-specified feature-selection data 114. An example of a ground truth frame 112 is the first frame of video content or a first frame involved in an object-classification process (e.g., the frame acted on by a user and used as the ground truth frame with respect to subsequent frames). The user-specified feature-selection data 114 can be specified via one or more user inputs. In one example, one or more user inputs can identify a boundary of a target object or feature, representative pixels or other portions of a target object or feature, etc.

The video content can also include one or more memory frames 108 (e.g., a second frame of the video content following the first frame and any intermediary frames in a sequence), for which memory feature-classification data 110 (e.g., segmentation masks) have been computed. A query frame can be another frame of the video content (e.g., a third frame of the video content following the first and second frames and any intermediary frames in the sequence). The query frame may lack feature classification data for a target feature (e.g., a segmentation mask for a target object) computed via the video processing engine 102 or specified via user inputs.

In one example, the query frame accessed at block 202 is a video frame for which a segmentation mask is to be computed. For example, the video processing engine 102 can access video content from a video data store 104, which can be located on one or more memory devices available over a data network, one or more memory devices connected to a data bus on a computing device that executes the video processing engine 102, or some combination thereof. The video content can include a ground truth frame 112, for which a mask has been specified via one or more user inputs (e.g., the first frame of the video content). The video content can also include one or more memory frames 108 (e.g., a second frame of the video content following the first frame and any intermediary frames in a sequence), for which segmentation masks have been computed. A query frame can be another frame of the video content (e.g., a third frame of the video content following the first and second frames and any intermediary frames in the sequence). The query frame may lack a segmentation mask computed via the video processing engine 102 or specified via user inputs.

At block 204, the process 200 involves generating a query key map and a query value map from features of a query frame. In one example, generating a query key map and a query value map involves applying an encoder of a space-time memory network (e.g., the space-time memory network 103) and an embedding layer of the space-time memory network to features of the query frame. The video processing engine 102 can perform a set of operations at block 204 that include encoding the query frame into a query feature map and embedding the query feature map into a query key map 122 and a query value map 124. For instance, the video processing engine 102 can execute a query encoder of the space-time memory network 103. The query encoder can encode the query frame image into a feature map having a dimensionality of H×W×C. The video processing engine 102 can embed, via one or more embedding layers of the space-time memory network 103, the feature map into lower-dimensionality data structures, such as a query key map 122 having a dimensionality lower than the feature map (e.g., dimensions of H×W×C/8) and a query value map 124 having a dimensionality greater than the query key map 122 (e.g., dimensions of H×W×C/2).

In some aspects, the process 200 includes a block 205 that includes operations for generating memory key maps and memory value maps. The dashed line in FIG. 2 indicates that in some aspects, the block 205 may be performed by a video processing engine 102, and, in other aspects, the block 205 may be performed by a separate engine or a computing device different from the computing device that performs other operations in the process 200. For example, the video processing engine 102 or other suitable engine can also generate memory key maps and memory value maps for features of the memory frames. For each memory frame 108 used by the process 200, the video processing engine 102 or other suitable engine can perform a set of operations, prior to or concurrently with performing block 204, that include encoding the memory frame 108 and associated memory feature-classification data 110 (e.g., a segmentation mask) into a memory feature map and embedding the memory feature map into a memory key map 126 and a memory value map 128.

In one example, block 205 can be implemented by computing individual memory feature maps for respective memory frames in the set of memory frames. Computing an individual memory feature map for a respective memory frame can include accessing the respective memory frame and a respective memory segmentation mask computed by the space-time memory network 103 for the respective memory frame. Computing the individual memory feature map can also include generating a concatenated input by concatenating the respective memory frame and the respective segmentation mask. Computing an individual memory feature map can also include inputting the concatenated input to a memory encoder of the space-time memory network 103. Computing an individual memory feature map can also include encoding, with the memory encoder, the concatenated input into the individual memory feature map. For instance, the video processing engine 102 can execute an encoder that encodes an input, such as a concatenation of the memory frame image and its associated memory feature-classification data 110, into a feature map having a dimensionality of H×W×C.

Block 205 can also include embedding the individual memory feature maps into a set of individual memory key maps and a set of individual memory value maps. Each individual memory key map can have a smaller dimension than a corresponding individual memory value map. For example, similar to the query frame embedding discussed above, the video processing engine 102 can embed the feature map into lower-dimensionality data structures, such as a memory key map 126 having a dimensionality lower than the feature map (e.g., dimensions of H×W×C/8) and a memory value map 128 having a dimensionality greater than the query key map 122 (e.g., dimensions of H×W×C/2). Block 205 can also involve combining the set of individual memory key maps into the memory key map via stacking along a temporal dimension in the set of individual memory key maps. Block 205 can also involve combining the set of individual memory value maps into the memory value map via stacking along a temporal dimension in the set of individual memory value maps.

These encoding and embedding operations, examples of which are described in more detail with respect to FIGS. 3 and 4 below, can extend the functionality of memory network techniques. For instance, previous memory networks utilize a one-dimensional memory, such as a sequence of feature vectors that can be used, in one example, for question answering via a memory having a series of slots with each slot containing embedded features of a sentence. Aspects described herein can extend this memory network technique directly to video content, where a memory contains a series of slots, each with global features of a frame. To facilitate pixel-wise decisions for video segmentation or other feature-classification tasks, the three-dimensional memory in the space-time memory network 103 (i.e., the use of the feature, key, and value maps) provides a space-time representation. The space-time memory network 103 uses a three-dimensional tensor, where the address corresponds to the space-time location on a video and writing new memory can be performed with a tensor concatenation. With the space-time memory, a space-time memory read operation can be implemented that matches the query (a pixel in a frame) to the information stored in the memory.

For instance, at block 206, the process 200 involves retrieving, for one or more memory frames from the video content, a memory key map and a memory value map that are computed from a set of memory frames from the video content. At least one of these memory frames has a first selection of the target feature that is computed based on (i) a user-specified selection of the target feature in a ground truth frame of the video content and (ii) a second selection of the target feature computed for a second memory frame. In one example, a given memory frame can have a computed segmentation mask that is generated based on a user-specified mask with respect to the ground truth frame 112 (e.g., a ground truth mask of a target object identified via user input in a first frame). The video processing engine 102 can use the ground truth mask to compute the mask for a second frame, where the second frame is stored as a memory frame 108 along with the computed segmentation mask. In this example, the memory frame can be retrieved at block 206 for computing a segmentation mask with respect to the query frame 106.

At block 208, the process 200 involves computing one or more memory weights by applying a similarity function to the query key map and the memory key map retrieved at block 206. For instance, the video processing engine 102 performs a space-time memory read 120 by computing soft weights (i.e., memory weights). The video processing engine 102 can compute these memory weight by measuring the similarities between some or all pairs from the query key map 122 and the memory key map 126. The video processing engine 102 can perform the similarity matching in a non-local manner by comparing each space-time location in the memory. In one example, intermediate feature vectors on the query frame and one or more memory frames are densely matched non-locally, covering spatiotemporal pixels in a feed-forward fashion.

At block 210, the process 200 involves classifying the content in the memory frame as depicting the target feature based on a weighted summation that includes the memory weights applied to memory locations in the memory value map. For instance, the video processing engine 102 can retrieve, from memory values maps 128, various memory values. The video processing engine 102 can apply a weighted summation to the retrieved memory values, where the summation is weighted with the memory weights from block 208. The video processing engine 102 can concatenate weighted summation with query values. The video processing engine 102 can decode the output of the concatenation to obtain the query feature-classification data 134. In one example, this classification involves generating the segmentation mask for the query frame based on a weighted summation that includes the memory weights applied to memory locations in the memory value map (e.g., constructing a segmentation mask for the query frame via the decoding operation).

In one example, the video processing engine 102 computes an output value map by concatenating the query value map from block 204 with the weighted summation at block 210. The video processing engine 102 can construct query feature-classification data 134 by decoding this output value map (i.e., the output of the space-time memory read 120). Additional examples of implementing block 210 are described herein with respect to FIG. 6.

Example of an Implementation for a Space-Time Memory Network

Figure 3:
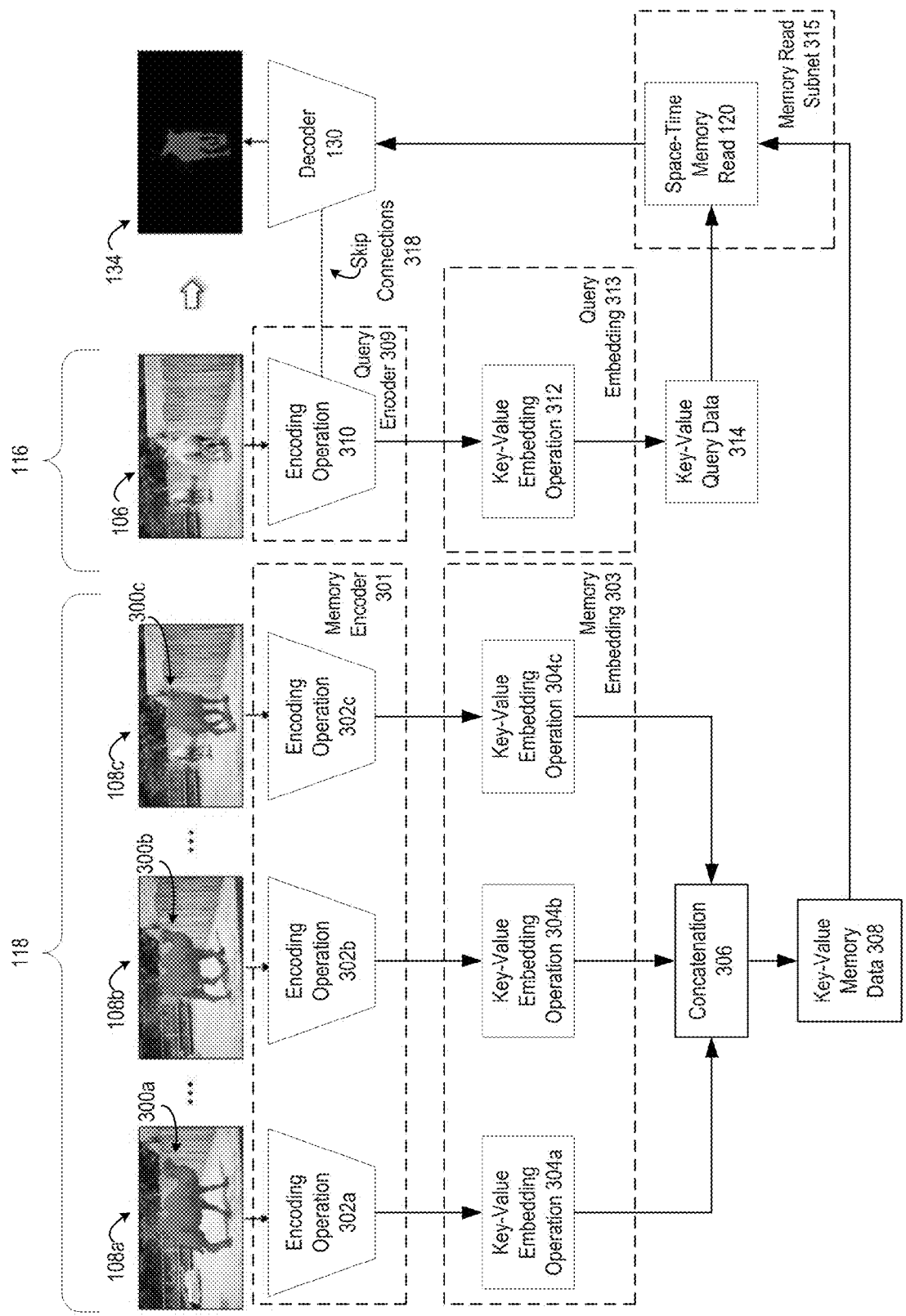
FIG. 3 depicts an example of a framework for a space-time memory network of FIG. 1 that can be used in the process depicted in FIG. 2, according to certain aspects of this disclosure.

FIG. 3 depicts an example of a framework for a space-time memory network 103 that generates a segmentation mask 320 for a given query frame 106. For illustrative purposes, this example involves segmentation of a target object in video content. But the architecture depicted in FIG. 3 can be used for a space-time memory network used for other feature-classification purposes.

In this example, both memory and query frames are embedded into pairs of key and value maps through a dedicated encoder network followed by key-value embedding layer. Each key map is used to compute similarities data from the query frame and data from one or more memory frames. Each value map includes content of the memory frame (e.g., data describing the segmentation mask and the background region for the memory frame).

In FIG. 3, a memory map generation operation 118 has been applied to various memory frames 108a-c having computed segmentation masks 300a-c, respectively. The memory map generation operation 118 involves, for example, the video processing engine 102 applying a memory encoder 301. The memory encoder 301 performs encoding operations 302a-c to the memory frames 108a-c, respectively. In a given encoding operation, the video processing engine 102 inputs, to the memory encoder 301, a memory frame (e.g., an RGB frame image) and a corresponding segmentation mask computed for the memory frame.

In some aspects, the segmentation mask is represented as a single channel probability map having values between 0 and 1. For instance, a softmax output could be used for estimated segmentation masks. The video processing engine concatenates inputs along a channel dimension and provides the concatenated inputs to the memory encoder 301. The memory encoder 301 generates a feature map.

In some aspects, the video processing engine 102 performs the memory map generation operation 118 by applying one or more memory embedding layers 303 to the output of the memory encoder 301. Applying one or more memory embedding layers 303 embeds the output of the memory encoder 301 into key-value map pairs. For instance, one or more memory embedding layers 303 can perform key-value embedding operations 304a-c on the outputs of encoding operations 302a-c, respectively. An example of a set of memory embedding layers 303 is a set of convolutional layers (e.g., two parallel convolutional layers). In one example, each convolutional layer uses a 3×3 filter that reduces the feature channel size (e.g., eight times for a key parameter and two times for a value parameter).

If multiple memory frames 108a-c are available, each of the memory frames 108a-c is independently encoded and embedded into respective key-value map pairs, as described above with respect to block 205 in FIG. 2. The key-value map pairs from different memory frames are stacked along a temporal dimension, e.g., via one or more concatenation layers 306. For instance, a set of individual memory key maps is stacked along a temporal dimension to generate a three-dimensional memory key map, and a set of individual memory value maps is stacked along a temporal dimension to generate a three-dimensional memory value map.

The output of the memory embedding is the key-value memory data 308. The key-value memory data 308 includes three-dimensional key-value map pairs. A key-value map pair, which includes a key map $k^M$ and a value map $v^M$, can be represented by the following formula:

$$(k^M \in \mathbb{R}^{T \times H \times W \times C/8}, v^M \in \mathbb{R}^{T \times H \times W \times C/2}).$$

In this formula, T is the number of the memory frames, H is the height of the encoder feature map (i.e., the last convolution output of the memory encoder 301), W is the width of the encoder feature map, and C is feature dimension of the encoder feature map.

In the exampled depicted in FIG. 3, query frames without segmentation masks can be embedded into key-value query data 314 via the query map generation operation 116. To do so, the video processing engine 102 applies a query encoder 309, which performs an encoding operation 310, followed by one or more query embedding layers 313, which perform one or more key-value embedding operations 312. Applying one or more query embedding layers 313 embeds the output of the query encoder 309 into key-value map pairs. An example of a set of query embedding layers 313 is a set of convolutional layers (e.g., two parallel convolutional layers). In one example, each convolutional layer uses a 3×3 filter that reduces the feature channel size (e.g., eight times for a key parameter and two times for a value parameter).

The query frame 106 is embedded into a key-value map pair in a manner similar to the memory frames 108a-c, with some differences from the memory frame encoding. For example, the input to the query encoder 309 is a frame (e.g., an RGB image) without a segmentation mask. As another example, a single query frame is embedded into query key-value maps.

The output of the key-value embedding operations 312 is the key-value query data 314. The key-value query data 314 can include a pair of 2D key and value maps $k^Q$ and $v^Q$, represented by the following formula:

$$(k^Q \in \mathbb{R}^{H \times W \times C/8}, v^Q \in \mathbb{R}^{H \times W \times C/2}).$$

In this formula, H is the height of the encoder feature map (i.e., the last convolution output of the query encoder 309 that performs the encoding operation 310), W is the width of the encoder feature map, and C is feature dimension of the encoder feature map.

Figure 4:
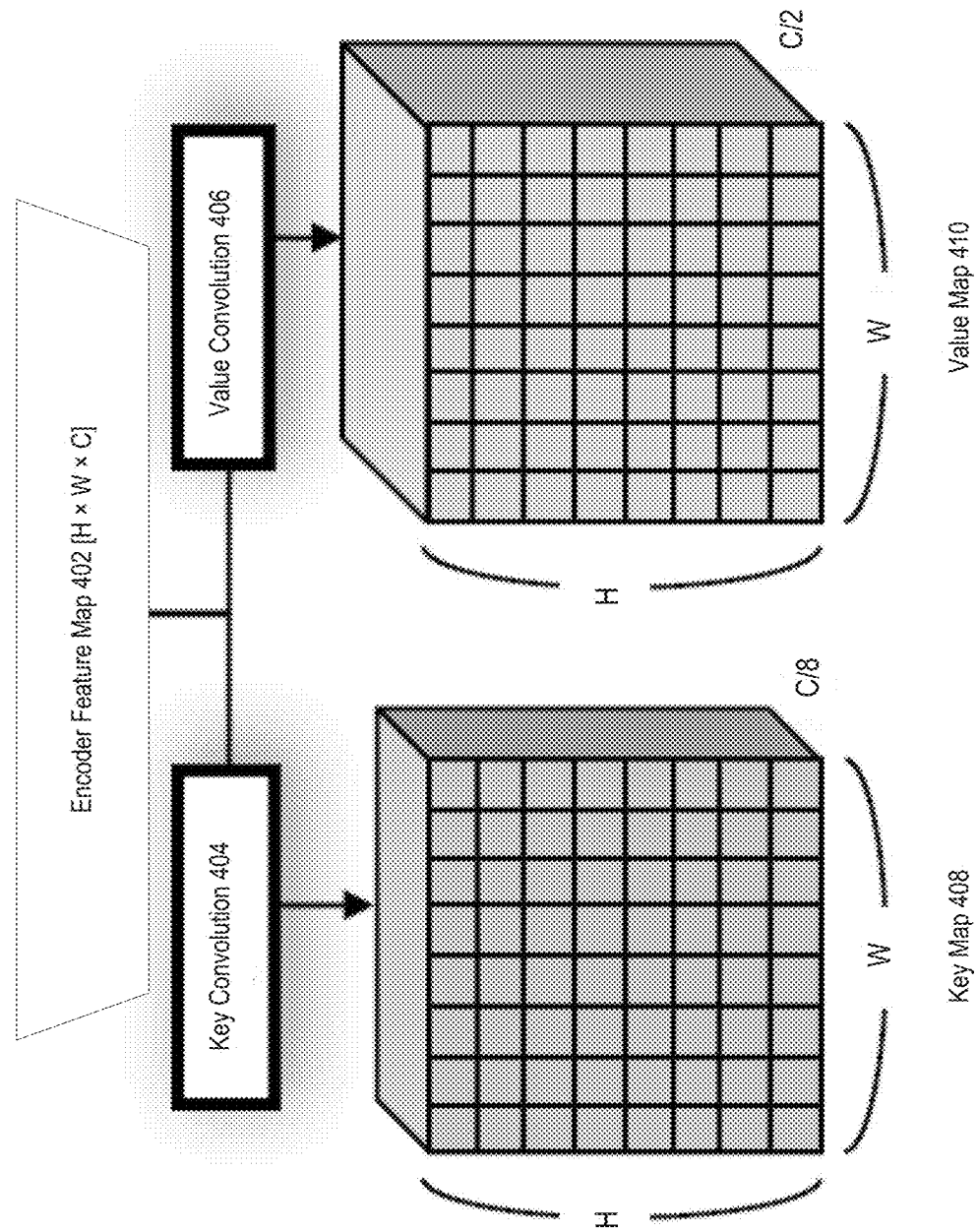
FIG. 4 depicts an example of an embedding operation used in the framework of FIG. 3, according to certain aspects of this disclosure.

FIG. 4 depicts an example of an embedding operation applied to the output of a memory encoder 301 or query encoder 309 used in the framework of FIG. 3. This example, in which a feature map from an encoder is linearly embedded into key and value maps through two parallel convolutional layers (e.g., a set of memory embedding layers 303 and/or a set of query embedding layers 313), can be used to implement any of the embedding operations 304a-c and 312 depicted in FIG. 3. In this example, an encoder feature map 402 having the size H×W×C is provided to a key convolution layer 404 and a value convolution layer 406. The key convolution layer 404 outputs a key map 408 having the size H×W×C/8. The value convolution layer 406 outputs a value map 410 having the size H×W×C/2.

Returning to FIG. 3, a memory read subnet 315 performs the space-time memory read 120. The decoder 130 computes a segmentation mask 320 for the query frame 106 from the output of the space-time memory read 120 and a query feature map generated by the query encoder 309. The decoder receives, as an input, the output of the space-time memory read 120. This output can be, for example, a concatenated tensor of the query value map and the memory value maps, which are generated via the memory map generation operation 118 and retrieved from memory in order for the video processing engine 102 to generate the segmentation mask 320. The decoder also receives, as another input, the query feature map generated by the query encoder 309. The query encoder 309 can provide the query feature map to the decoder 130 via one or more skip-connections 418. The decoder 130 reconstructs or otherwise builds a segmentation mask 320 from these inputs.

Figure 5:
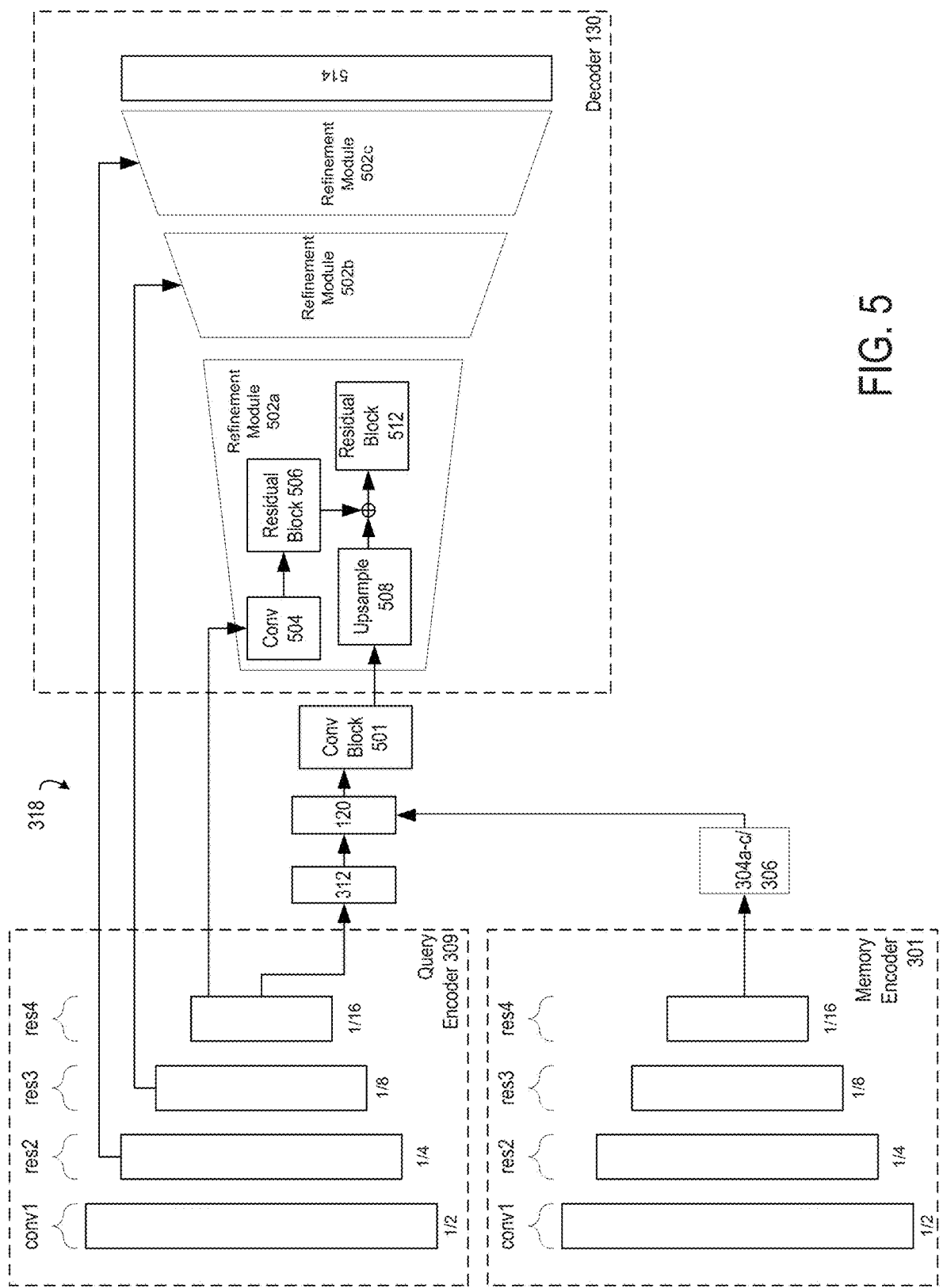
FIG. 5 depicts an example of an implementation of the framework from FIG. 3, according to certain aspects of this disclosure.

FIG. 5 depicts an example of an implementation of the framework from FIG. 3. The implementation depicted in FIG. 5 is provided for illustrative purposes only. Other encoder or decoder architectures can be used to implement the encoding and decoding operations described above with respect to FIG. 3.

In FIG. 5, a deep residual networks having 50 layers ("ResNet50") is used as a backbone network for the memory encoder and the memory decoder. A ResNet includes a set of stacked "residual units," each of which can be expressed as $$y_l = h(x_l) + \mathcal{F}(x_l, W_l),$$

$$x_{l+1} = f(y_l),$$

where $x_l$ and $x_l+1$ are the input and output of the l-th unit, $\mathcal{F}$ is a residual function, $h(x_l)=x_l$ is an identity mapping, and f is a rectified linear unit function. A ResNet can be used for the memory encoder 301, the query encoder 309, or both (as depicted in the example of FIG. 5). For instance, a stage-4 (res4) feature map with output stride 16 can be used as the encoder output for computing the key-value embedding via each of the key-value embedding operations 304a-c and 312. In the memory encoder 301, the first convolution layer is modified to be able to take a four-channel tensor by implanting additional single channel filters. The network weights can be initialized from a suitable pre-trained model (e.g., an ImageNet model), with certain added filters that are initialized randomly.

In this example, the video processing engine 102 employs, as a building block of the decoder, a refinement module. Each of the refinement modules 502a-c can allow the decoder 130 to merge features at different scales. In one example of a refinement module 502a, a 3×3 convolution layer 504 is followed by a first residual block 506. The output of the first residual block 506 is combined with the output of an upsampling block 508, and the combined output is provided to a second residual block 512.

In the example depicted in FIG. 5, the output of the space-time memory read 120 is compressed to have 256 channels by a convolutional layer and a residual block (collectively depicted as a convolutional block 501). Multiple refinement modules gradually upscale the compressed feature map by two times at each stage. In a given stage, a refinement module receives the output of a previous stage and a query feature map from the query encoder 309 at a corresponding scale through skip connections.

In FIG. 5, the upsampling block 508 of the refinement module 502a receives, as an input, the compressed feature map outputted by the convolutional block 501, and the convolution layer 504 of the refinement module 502a receives, as an input via one of the skip connections 318, a query feature map from the query encoder 309 at a corresponding scale. Similarly, the upsampling block of the refinement module 502b receives, as an input, the compressed feature map outputted by the refinement module 502a, and the convolutional layer of the refinement module 502b receives, as an input via one of the skip connections 318, a query feature map from the query encoder 309 at a corresponding scale. The upsampling block of the refinement module 502c receives, as an input, the compressed feature map outputted by the refinement module 502b, and the convolutional layer of the refinement module 502c receives, as an input via one of the skip connections 318, a query feature map from the query encoder 309 at a corresponding scale.

In this example, the decoder 130 can include multiple refinement modules (each of which includes the blocks depicted within the refinement module 502a) and a final convolution layer followed by a softmax layer (collectively depicted as element 514 in FIG. 5) to generate the segmentation mask. The size of the mask output can be ¼ of the input image size. Each convolution layer 504 in a respective refinement module can use a 3×3 filter. Each refinement module's convolution layer 504 can produce a feature map with 256 channels. The final convolution layer depicted in element 514 can produce a two-channel feature map.

Figure 6:
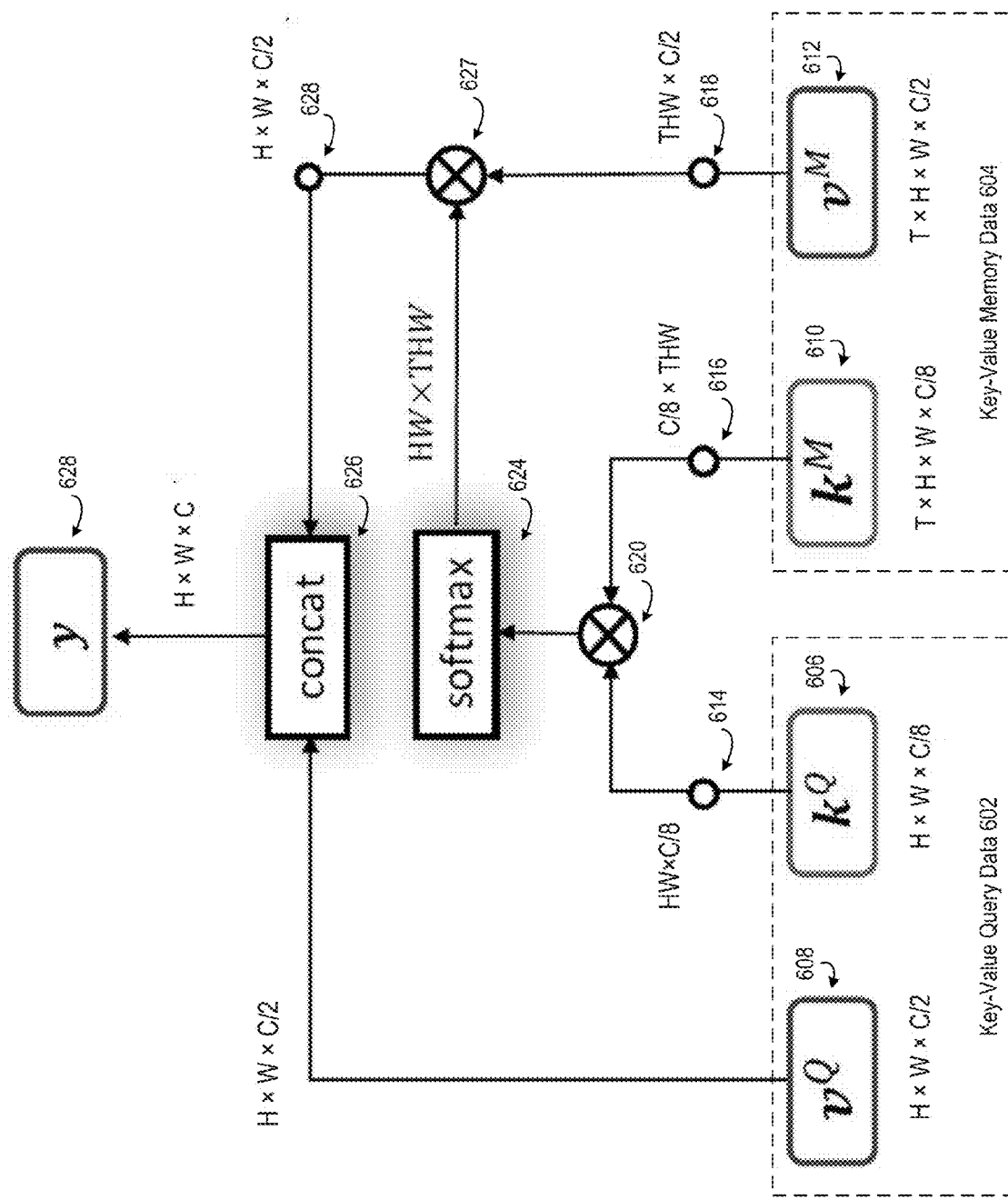
FIG. 6 depicts an example of an implementation for a space-time memory read used in one or more of the examples of FIG. 1-5, according to certain aspects of this disclosure.

FIG. 6 depicts an example of implementing the space-time memory read 120. In this example, the space-time memory read 120 is implemented using basic tensor operations on deep learning platforms. A memory read subnet 315 can have various layers suitable for implementing these tensor operations.

In this example, the video processing engine 102 accesses key-value query data 602, which includes a query key map 606 (i.e., k$(^Q)$) and a query value map 608 (i.e., v$^Q$). In some aspects, the key-value query data 602 is generated by the encoding operation 310 and the key-value embedding operation 312 depicted in FIG. 3. The video processing engine 102 also accesses key-value memory data 604, which includes a memory key map 610 (i.e., k$^M$) and a memory value map 612 (i.e., v$^M$). In some aspects, the key-value memory data 604 is generated by one or more encoding operations 302a-c and one or more corresponding key-value embedding operations 304a-c depicted in FIG. 3.

The video processing engine 102 computes a soft address (i.e., a memory weight) by measuring similarities between pixels on the query key map 606 and pixels on each memory key map 610. The similarity matching is performed in a non-local manner that compares space-time locations in the memory. Thus, a distance or other similarity measure with respect to a query key map 606 and a given memory key map 610 is used to compute a memory weight that is applied to a memory value map 612 generated from the same memory frame as the given memory key map 610.

To compute the soft address, the video processing engine 102 applies operation 614 to reshape and transpose the query key map 606 and operation 616 to reshape and transpose the memory key map 610. The video processing engine 102 also applies a matrix product operation 620 to the outputs of these reshaping and transposing operations 614 and 616. The video processing engine 102 also applies a softmax computation 624 to output the soft address as the memory weight.

The video processing engine 102 modifies the memory value map 612 using a weighted summation with the soft address (i.e., memory weight), as depicted by the matrix product operation 627. The video processing engine 102 also applies a concatenation 626 that concatenates the memory value map, as modified via the transpose and reshaping operation 618 and the matrix product operation 627, with the query value map 608. The concatenation 626 outputs an output value map 628 (i.e., value map y). The output value map 628, which is the output of the space-time memory read 120, is provided to the decoder 130.

The video processing engine can apply the space-time memory read 120 to every location on the query feature map outputted by the query encoder. The space-time memory read 120 can be summarized as:

$$y_i \left[ v_i^Q, \frac{1}{C} \sum_{\forall j} f(k_i^Q, k_j^M) v_j^M \right], \quad (1)$$

In Equation (1), i and j are, respectively the indices of a query and a memory location. The function C=$\Sigma_{\forall j} f(k_i^Q, k_j^M)$ is a normalizing factor, and [ ˙, ] indicates concatenation. The similarity function f can an exponential of the dot-product similarity, such as:

$$f(k_i^Q, k_j^M) = \exp(k_i^Q \circ k_j^M), \quad (2)$$

In Equation 2, ∘ denotes a dot product.

Examples of Training Operations

Figure 7:
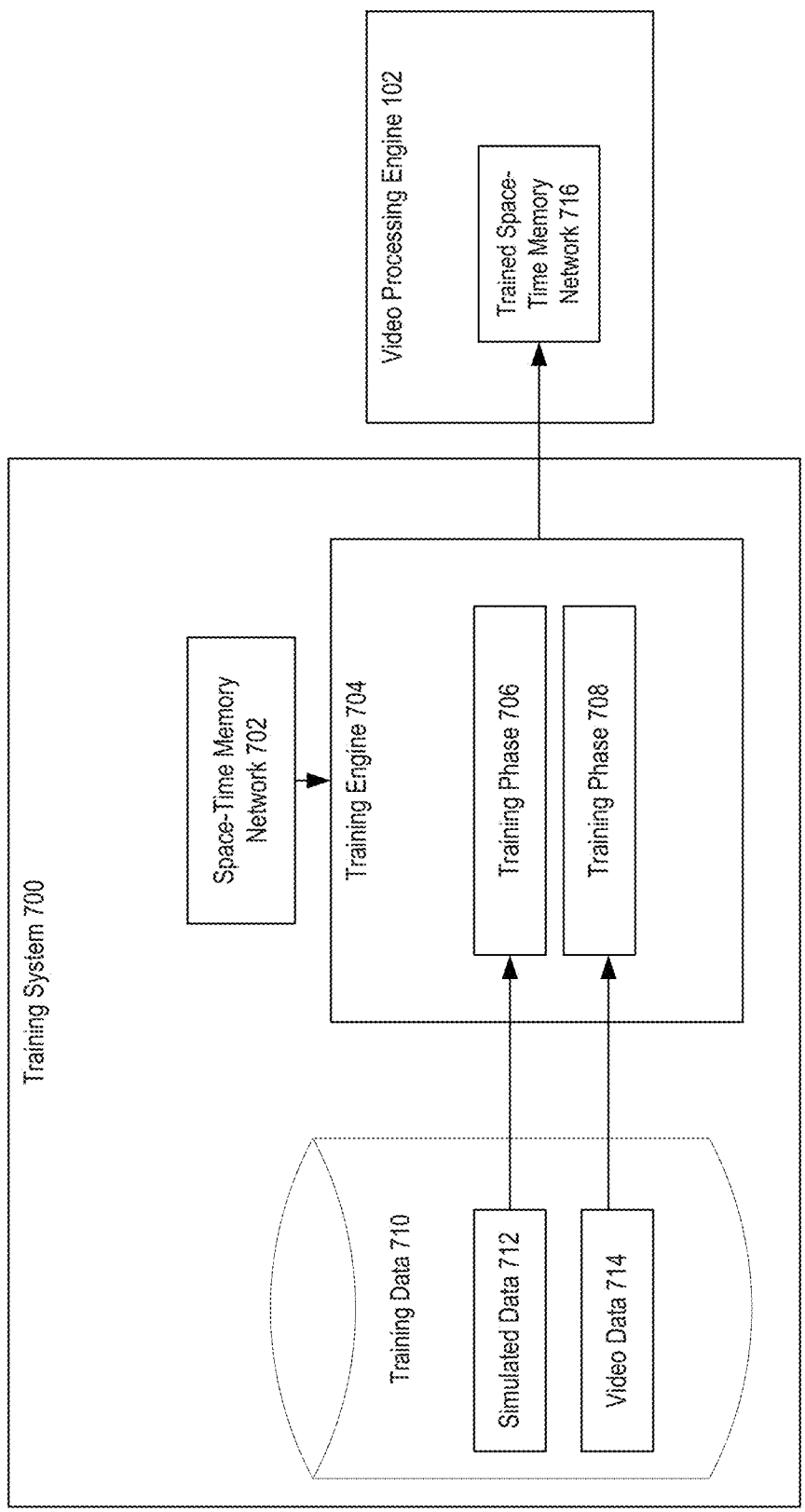
FIG. 7 depicts an example of a training system for training a space-time memory network used in one or more of the examples of FIG. 1-6, according to certain aspects of this disclosure.

FIG. 7 depicts an example of a training system 700 for training a space-time memory network used by the video processing engine 102. The training system 700 can also include one or more processing devices that execute a training engine 704. The training engine 704 can modify, via a training process, an initial space-time memory network 702 and thereby output a trained space-time memory network 716 (e.g., the space-time memory network 103 depicted in FIGS. 1-6) for use by the video processing engine 102. The training system 700 can also include (or be communicatively coupled to) one or more storage devices that store training data 710.

The training engine 704 trains the initial space-time memory network 702 to read relevant information from a set of memory frames in an external memory built by pixel-level annotation (e.g., one or more video frames with segmentation masks). In some aspects, a training process executed by the training engine 704 jointly trains the various network segments and layers (e.g., the query and memory encoders, the embedding layers, the memory read subnet, and the decoder). In the training process, the training engine 704 trains the space-time memory network 103 on simulated data 712 generated from static image datasets in a first training phase 706. The training engine 704 also trains the initial space-time memory network 702 on un-simulated (e.g., "real") video data 714 in a second training phase 708. In some aspects, using both training phases 706 and 708 can increase the performance of the trained space-time memory network 716 outputted by the training system 700. For example, diverse objects encountered during the first training phase 706 can help the generalization performance of the trained space-time memory network 716.

In some aspects, the initial space-time memory network 702 learns, via a training process, a semantic spatio-temporal matching between distant pixels. This can allow the initial space-time memory network 702 to be trained without requiring long training videos or temporal consistency constraint on the input video, which in turn allows the space-time memory network to use different encoder or decoder architectures. For example, the training engine 704 can train the space-time memory network 103 with a relatively small number of frames having segmentation masks (e.g., a ground truth mask applied to an initial image and a small number of other images with segmentations masks). Since a small amount of training data, can be used to accurately train the initial space-time memory network 702, static image datasets can be used to simulate training video frames (i.e., generate the simulated data 712). Generating the simulated data 712 can involve transforming each static image in a set of static images into a set of multiple images that collectively comprise training "frames," without requiring long sequences of temporally consistent video frames.

For example, the training system 700 could be used to generate a synthetic video clip having three training frames by applying random affine transforms (e.g., rotation, sheering, zooming, translation, and cropping), with different parameters, to a static image from a static image dataset. The training system 700 can be used to combine the resulting image datasets with annotations identifying segmentation masks or other annotations identifying a target feature of interest. The annotations can be generated using salient object detection or semantic segmentation. The training engine 704 can train the space-time memory network 103, in a first training phase 706, using the simulated data 712 that includes these static image datasets with annotated segmentation masks. Applying this first training phase 706 can, in some aspects, allow the space-time memory network 103 to be robust against a wide variety of object appearance and categories.

The first training phase 706 can modify one or more components (e.g., one or more encoders, embedding layers, a memory read subnet, a decoder, etc.) of an initial space-time memory network 702 into an interim space-time memory network. In a second training phase 708, the training engine 704 can further train the interim space-time memory network with video data 714. The video data 714 can include real video data annotated with additional segmentation masks or other annotations identifying a target feature of interest. Real video data can be a sequence of frames captured by a video recording device, as opposed to the simulated video data generated by transforming a static image into a set of multiple images. For example, the training engine 704 can access available training sets (e.g., training videos available via a website, a private set of training videos, etc.). The training engine 704 can be used to sample a set of temporarily ordered frames (e.g., a sequence of three frames) from a training video. To learn the appearance change over a long time, the training engine 704 can randomly skip frames during the sampling. In one example, the maximum number of frames to be skipped is gradually increased from 0 to 25 during the training.

Each of the training phases 706 and 708 can involve configuring the neural network (or networks) used to perform the various operations depicted in FIGS. 3-6 and described above (e.g., encoding and embedding the various frames and accurately computing similarities between key maps of query and memory frames). In one example, each training phase can involve using randomly cropped 384×384 patches of frame from training videos. In this example, a mini-batch size is set to 4 and batch normalization layers are disabled. A suitable optimizer, such as the Adam stochastic optimization, can be used by the training engine 704.

Example of Multi-Object Segmentation

For illustrative purposes, certain aspects and examples described above involve a single target object in a video. But additional or alternative aspects can involve generating segmentation masks for multiple target objects.

For example, in a step for segmenting multiple target objects in the query frame, the video processing engine 102 can select multiple target objects by using a mask merging operation. The mask merging operation can involve independently computing segmentation masks for multiple target objects. For each desired target object, the video processing engine 102 applies the space-time memory network 103 to generate a segmentation mask. As explained above, a given segmentation mask can be represented as a single channel probability map filled with values between 0 and 1. Thus, the video processing engine 102 computes, for multiple target objects, respective mask probability maps that are independent of one another.

The video processing engine 102 merges these mask probability maps (i.e., the segmentation masks) using a soft aggregation operation. In one example of a soft-aggregation operation, a merged mask probability map can be generated using the following formula:

$$p_{i,m} = \sigma(l(\hat{p}_{i,m})) = \frac{\hat{p}_{i,m}/(1-\hat{p}_{i,m})}{\sum_{j=0}^{M} \hat{p}_{i,j}/(1-\hat{p}_{i,j})}, \quad (3)$$

$$\text{s.t. } \hat{p}_{i,0} = \prod_{j=1}^{M}(1-\hat{p}_{i,j}),$$

In Equation (3), $\sigma$ and $l$ respectively represent the softmax and logit functions, $\hat{p}_{i,m}$ is the network output probability of the object m at the pixel location i, m=0 indicates the background, M is the total number of objects, and $p_{i,m}$ is the probability of the object m at the pixel location i after performing the mask merging operation. At test time (e.g., when applying the trained space-time memory network 103), the video processing engine 102 classifies a pixel as depicting a particular one of the target objects I based on $p_{i,m}$ exceeding a threshold, having a maximum probability as compared to $p_{i,m}$ values for other target objects, or some combination thereof. Enforcing the condition in Equation (3) can ensure that M disjoint mask probability maps are generated for the M different target objects.

In some aspects, the video processing engine 102 performs mask merging in both training and testing. For example, rather than performing mask merging only during testing as a post-processing step, the video processing engine 102 can implement Equation (3) as a differential network layer. The video processing engine 102 can apply the differential network layer during a training phase and a testing phase. For instance, in one or more of the training phases 706 and 708, the training engine 704 can modify one or more aspects of the architecture of the space-time memory network 103 such that the condition included in Equation (3) (i.e., $\hat{p}_{i,0}=\Pi_{j=1}^{M}(1-\hat{p}_{i,j})$) is enforced. In this way, the video processing engine 102 performs per-pixel M+1 way classification (like semantic segmentation). The space-time memory network 103 used by the video processing engine 102 can be trained using the cross entropy. If multiple objects are present, the video processing engine 102 can provide additional information to the memory encoder 301 about other objects. Specifically, probability masks for all other objects, computed as $\sigma_{i,m}=\Sigma_{j\neq m}^{M}p_{i,j}$, are provided.

Implementation Option for Efficiently Using Processing Resources

As explained above, the video processing engine 102 uses the trained space-time memory network 103 for semi-supervised video object segmentation, in which a first frame's segmentation mask is identified via one or more selection inputs received from a user input device. The space-time memory network 103 processes a video frame-by-frame using available reference information (e.g., frame images with segmentation masks) as the memory frames. In one example, a video sequence includes a first frame followed by a second frame and a third frame. To estimate a second frame's segmentation mask from a first frame in which the segmentation mask is manually specified via user inputs, the first frame with segmentation mask is used as the memory frame and the second frame without segmentation mask is used as the query frame. For a third frame, both the first and the second frames are used as the memory frames. This can be repeated to compute segmentation masks for multiple frames in the video sequence.

Certain computational issues arise when using an entire set of previous frames as memory frames. For instance, graphics processing unit ("GPU") memory usage is increased in proportion to the number of the memory frames. The increased GPU memory usage could exceed maximum capacity. In another example, a read block can become a bottleneck of a forward pass due to a large matrix product.

In some aspects, the video processing engine 102 can use a subset of previous frames, rather than an entire set of previous frames, when applying the space-time memory network 103, which can thereby address one or more of these issues. For instance, first and last frames with segmentation masks can be used, as the first frame provides reliable mask information (i.e., a ground truth) due to being manually specified via one or more selection inputs from a user input device. The last frame, which can be a previous frame that has a segmentation mask and that is closest in time to the current frame in the video sequence, has a similar appearance to the current frame. Thus, accurate mask propagation and pixel matching can be achieved. Therefore, the video processing engine 102 can, as a default configuration, input these two frames into the space-time memory read 120.

In addition to the first and last frames, the video processing engine 102 can utilize intermediate frames (frames except for the first and the last frame) in any suitable manner. In one example, the video processing engine 102 can save new memory frame every N frames. In another example, the video processing engine 102 can save all memory frames, but only use every N intermediate frame as inputs to the space-time memory read.

N is a hyperparameter that indicates a number of intermediate memory frames to be used for classifying the content in the query frame (e.g., which memory frames are stored and/or which memory frames are retrieved in block 206). In some aspects, the video processing engine 102 identifies a value of N and selects, based on the hyperparameter, a set of memory frames for encoding and embedding in the implementation of FIG. 3. In some aspects, N can indicate a semantic diversity of the set of memory frames, a semantic uniformity of the set of memory frames, or some other semantic characteristic of the set of memory frames.

N can control the tradeoff between speed and accuracy. For instance, the video processing engine 102 can use N=5 or some other experimentally determined value. In some aspects, the value of N can be experimentally determined or otherwise computed based on the performance of the space-time memory network with respect to metrics such as region similarity, contour accuracy, runtime for computing a segmentation ask with the space-time network, etc. In additional or alternative aspects, the value of N can be experimentally determined or otherwise computed based on desirable semantic characteristics of the memory frames. For instance, the value of N can be experimentally determined or otherwise computed to increase semantic diversity among the memory frames stored for the space-time memory network 103 or used in a space-time memory read, to increase semantic uniformity among the memory frames stored for the space-time memory network 103 or used in a space-time memory read, to increase representativeness of the memory frames stored for the space-time memory network 103 or used in a space-time memory read, etc.

Example of a Computing System for Implementing Certain Aspects

Figure 8:
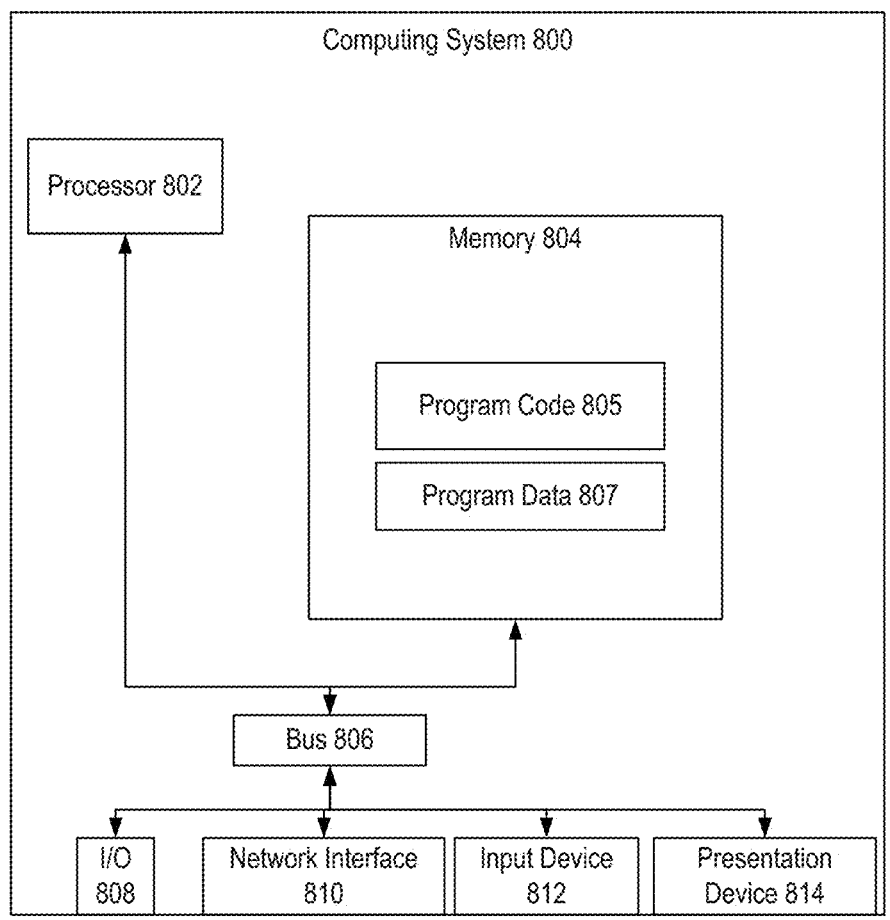
FIG. 8 depicts an example of a computing system for implementing one or more aspects of this disclosure.

Any suitable computing system or group of computing systems can be used for performing the operations described herein. For example, FIG. 8 depicts an example of a computing system 800. In some aspects, the computing system 800 includes a processing device 802 that executes program code 805 (e.g., the video processing engine 102 and/or the training engine 704), a memory device 804 that stores various program data 807 computed or used by operations in the program code 805 (e.g., data from the video data store 104 and/or the training data 710), one or more input devices 812, and a presentation device 814 that displays graphical content generated by executing the program code 805. For illustrative purposes, FIG. 8 depicts a single computing system on which the program code 805 is executed, the program data 807 is stored, and the input devices 812 and presentation device 814 are present. But various applications, datasets, and devices described can be stored or included across different computing systems having devices similar to the devices depicted in FIG. 8.

The depicted example of a computing system 800 includes a processing device 802 communicatively coupled to one or more memory devices 804. The processing device 802 executes computer-executable program code stored in a memory device 804, accesses information stored in the memory device 804, or both. Examples of the processing device 802 include a microprocessor, an application-specific integrated circuit ("ASIC"), a field-programmable gate array ("FPGA"), or any other suitable processing device. The processing device 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code 805. Non-limiting examples of a computer-readable medium include a magnetic disk, a memory chip, a ROM, a RAM, an ASIC, optical storage, magnetic tape or other magnetic storage, or any other medium from which a processing device can read instructions. The program code 805 may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as an input device 812, a presentation device 814, or other input or output devices. For example, the computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processing device 802 to perform one or more of the operations described herein. The program code includes, for example, the video processing engine 102, the training engine 704, or other suitable applications that perform one or more operations described herein. The program code may be resident in the memory device 804 or any suitable computer-readable medium and may be executed by the processing device 802 or any other suitable processor. The program code 805 uses or generates program data 807. Examples of the program data 807 include one or more of the memory frames, ground truth frames, feature-classification data, feature-selection data, key or value maps, etc. described herein with respect to FIGS. 1-7.

In some aspects, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices via a data network using the network interface device 810.

An input device 812 can include any device or group of devices suitable for receiving visual, auditory, or other suitable input that controls or affects the operations of the processing device 802. Non-limiting examples of the input device 812 include a recording device, a touchscreen, a mouse, a keyboard, a microphone, a video camera, a separate mobile computing device, etc. A presentation device 814 can include any device or group of devices suitable for providing visual, auditory, or other suitable sensory output. Non-limiting examples of the presentation device 814 include a touchscreen, a monitor, a separate mobile computing device, etc.

Although FIG. 8 depicts the input device 812 and the presentation device 814 as being local to the computing device that executes the program code 805, other implementations are possible. For instance, in some aspects, one or more of the input device 812 and the presentation device 814 can include a remote client-computing device that communicates with the computing system 800 via the network interface device 810 using one or more data networks described herein.

Experimental Results

Figure 9:
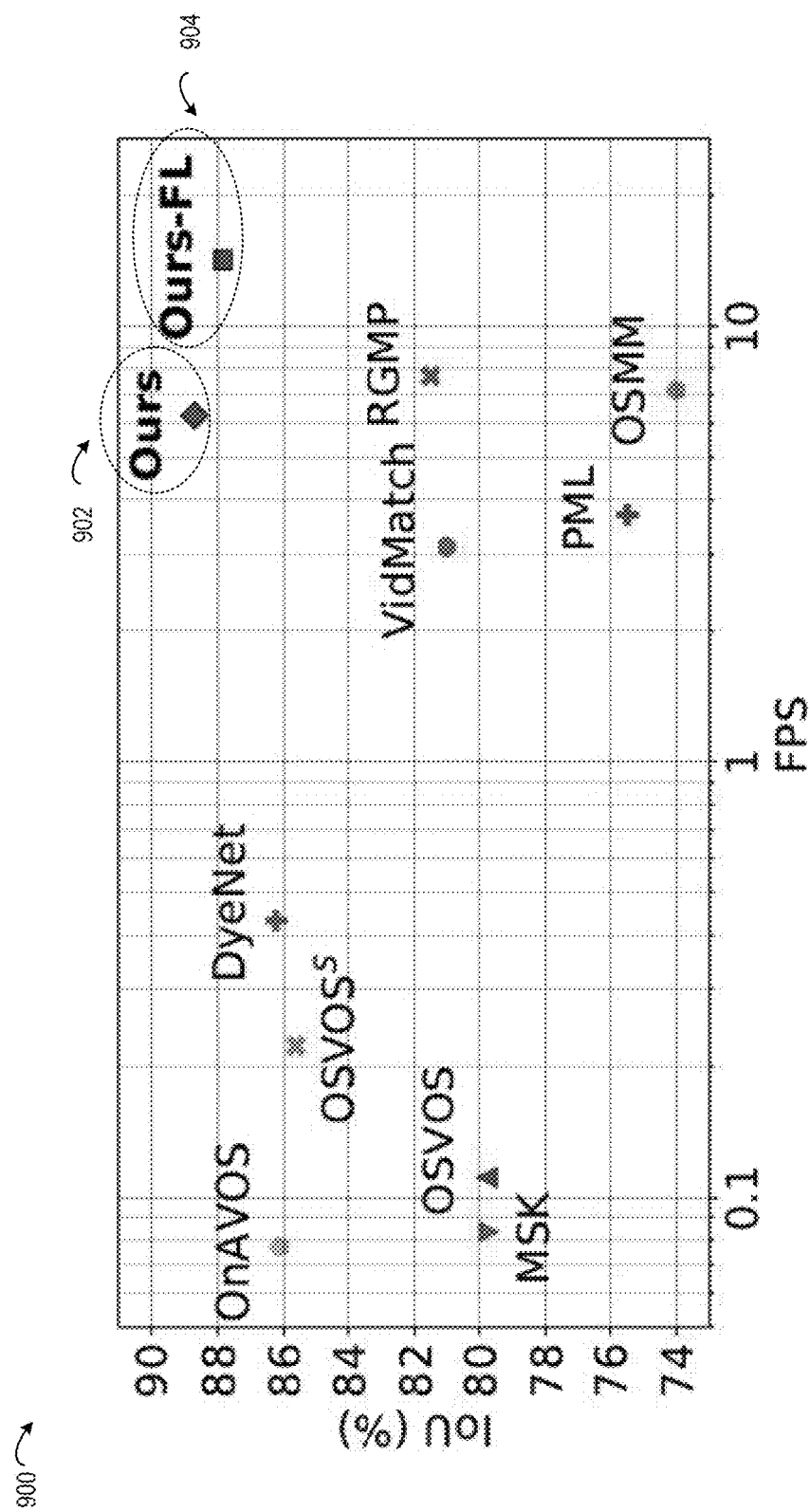
FIG. 9 depicts an example of an accuracy and speed comparison between certain aspects and existing techniques.

Experimental results show that certain implementations of aspects described herein outperform existing methods on public benchmark datasets by a large margin in terms of both accuracy and speed. For example, FIG. 9 depicts an example of an accuracy and speed comparison between existing techniques and an example of the aspects described herein. In the graph 900, accuracy is presented as a percentage of Intersection-over-Union ("IoU") on the vertical axis and speed is presented as frames-per-second expressed logarithmically on the horizontal exist. In this example, the entry 902 corresponding to an experiment using certain aspects described herein achieved the best performance (IoU 88.7%) on a DAVIS-2016 validation set and performed orders of magnitude faster than most of previous methods (0.16 seconds per frame). The entry 904, corresponding to an experiment using certain aspects described herein without frame memories, resulted in similarly high performance with respect to speed and accuracy. Other existing segmentation techniques applied to the same validation set include Online Adaptive Video Object Segmentation ("OnAVOS"), One-Shot Video Object Segmentation ("OSVOS"), Semantic OSVOS ("OSVOSs"), DyeNet, Reference-Guided Mask Propagation ("RGMP"), etc.

Figure 10:
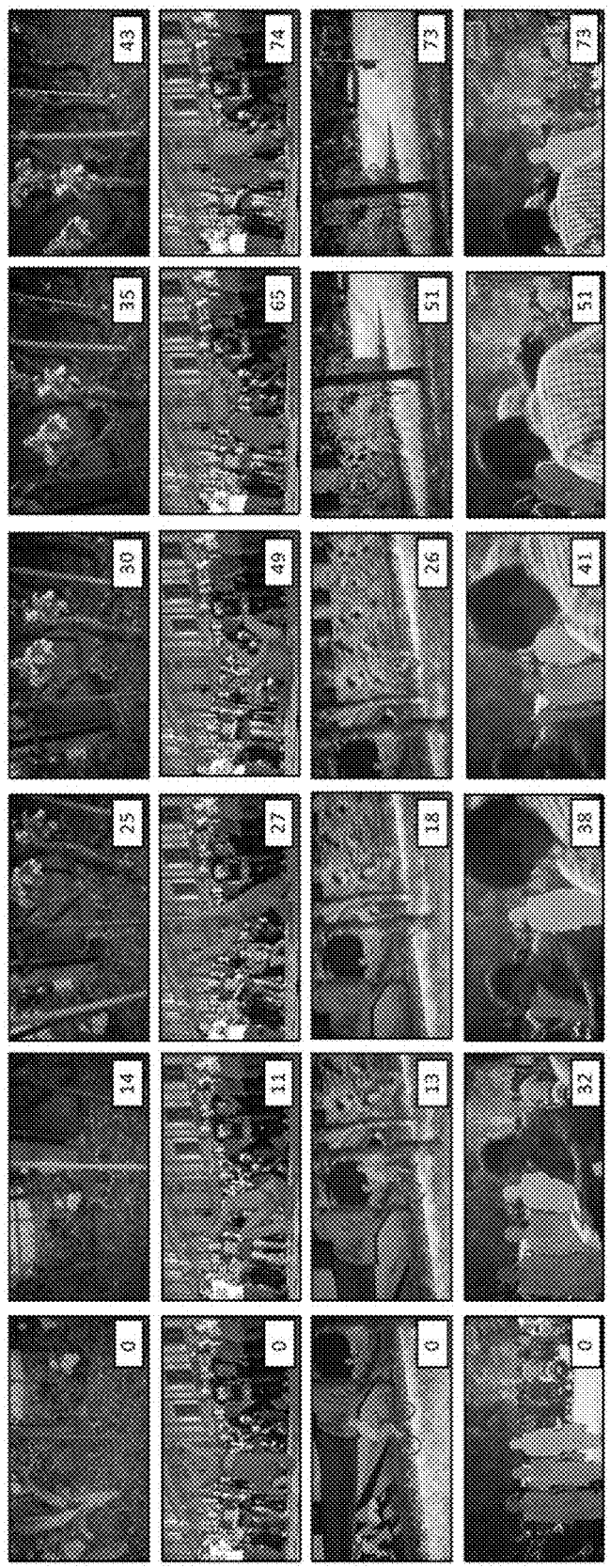
FIG. 10 depicts examples of qualitative results achieved using certain aspects described herein.

FIG. 10 depicts examples of qualitative results achieved using an example of the aspects described herein. In FIG. 10, qualitative results of segmentation performed on a DAVIS validation set are depicted. Frames 1000 are sampled at important moments (e.g., before and after occlusions). Frame indexes are shown at the bottom-right corner of each sample frame. Segmentation masks are indicated with red coloring (for a single target object), red and green coloring (for two target objects), and red, green, and yellow coloring (for three target objects).

Figure 11:
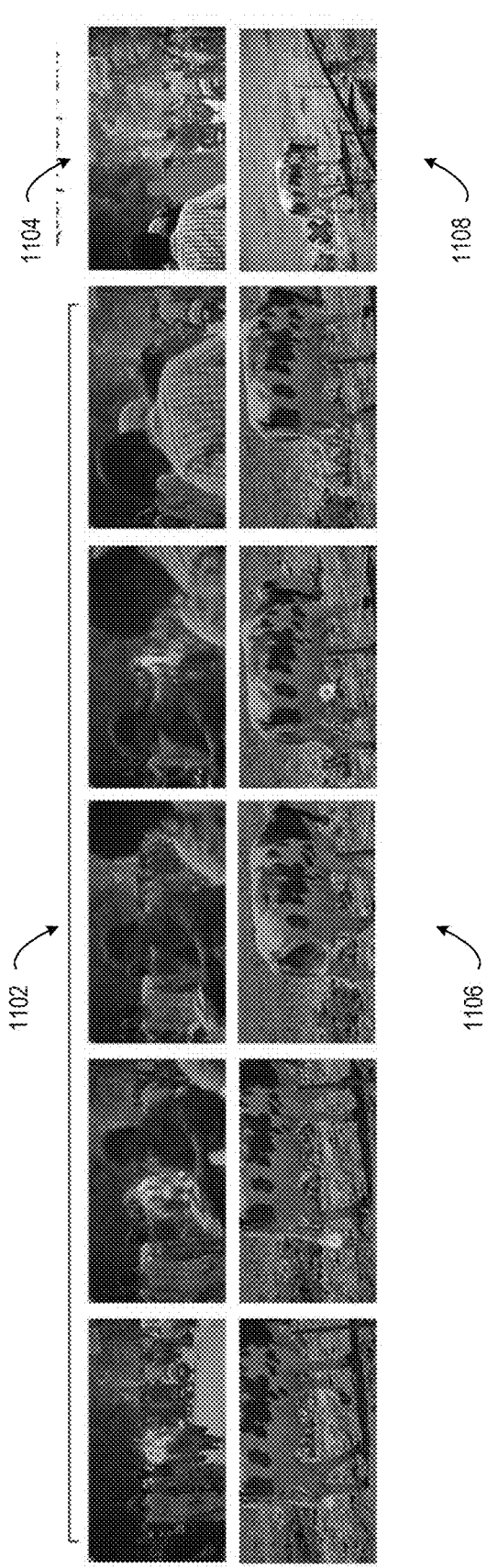
FIG. 11 depicts a visualization of an example of the space-time memory read operation described herein.

FIG. 11 depicts a visualization of an example of the space-time memory read operation described herein. In this example, memory weights (soft address) computed by the space-time memory read operation are overlaid to the frame images. The weights are computed for every pixel in the query image. For clarity of illustration, certain memory frames are enlarged where the area of interest is small. Averaged weights for the pixels inside the object area are visualized in the set of memory frames 1082 for the query frame 1104, in which the target object is colored in red. Retrieved weights for a selected pixel are visualized in the set of memory frames 1086 for the query frame 1108 in which the target object (pixel) is indicated by a red "X". As illustrated, the space-time memory read operation accurately matches the same objects, at the pixel level, to retrieve information in the memory.

Figure 12:
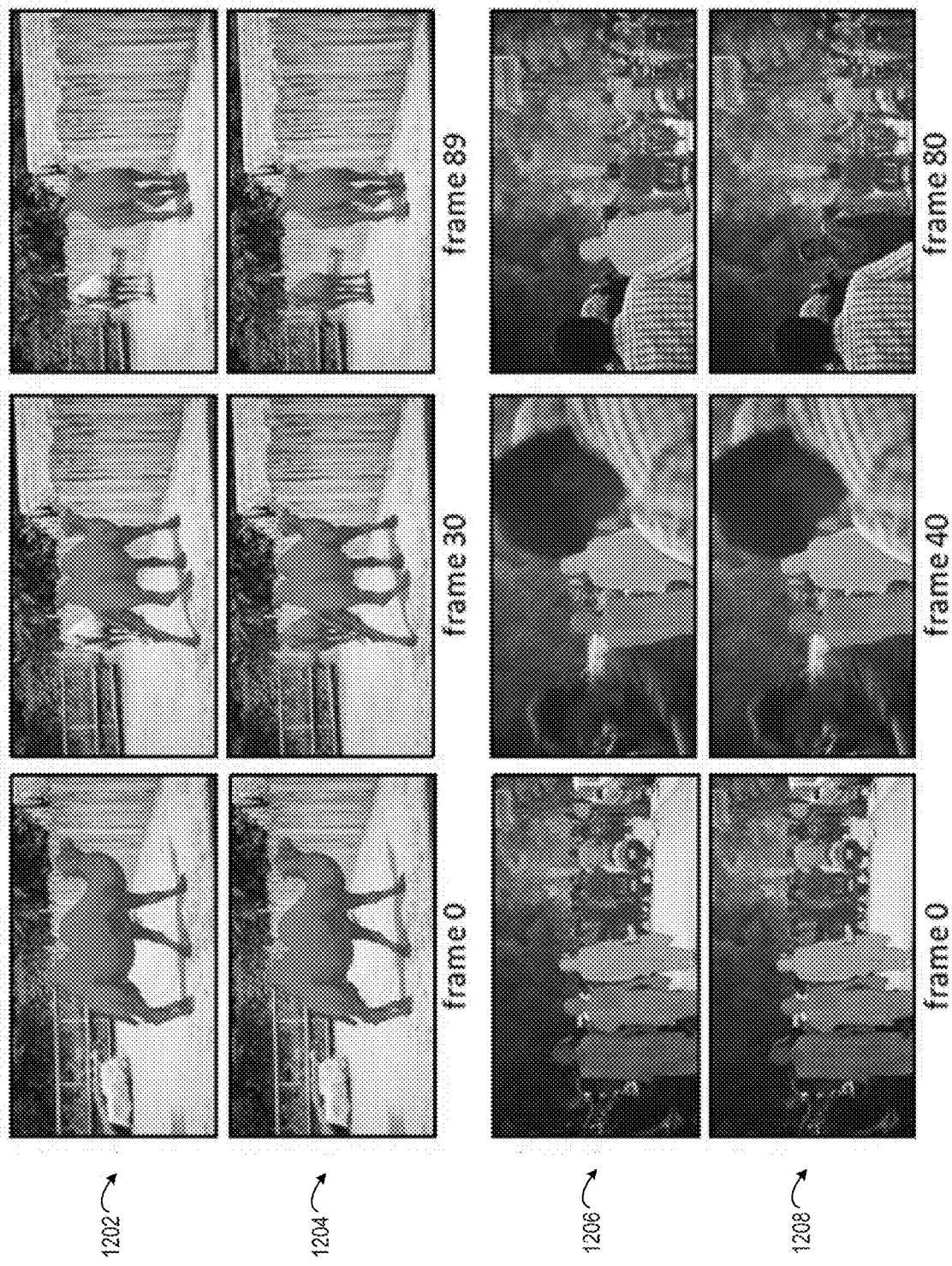
FIG. 12 depicts examples of visual comparisons between results with and without intermediate frame memories used by certain aspects described herein.

FIG. 12 depicts examples of visual comparisons between results with and without intermediate frame memories. For instance, as discussed above, the frequency of saving intermediate memory frames N (or using intermediate memory frames N in a space-time memory read operation) is a hyper-parameter that controls a trade-off between the efficiency and the accuracy. FIG. 12 depicts an example analyzing the effect of N, where rows 1202 and 1206 illustrate the effect of using intermediate memory frames and rows 1204 and 1208 illustrate the effect of omitting intermediate memory frames. In addition to different values of N, extreme cases that do not use the intermediate frame memories are tested. The examples in FIG. 12 indicate cases in which using the intermediate memory frames in a space-time memory read operation memory plays an important role, especially when the input video content poses challenges with respect to occlusions, drifts, or both.

In one example, the row 1202 includes video frames to which a segmentation mask has been applied and computed for a camel (i.e., a single target object) using intermediate frames with N=5. Without the use of intermediate memory frames, the segmentation mask is incorrectly applied to an additional camel in later frames, as depicted in the row 1204.

In another example, the row 1206 includes video frames to which a segmentation mask has been applied and computed for three individuals (i.e., three different target objects) using intermediate frames with N=5. Without the use of intermediate memory frames, the segmentation mask is no longer applied to one of the individuals (i.e., the target object indicated by yellow masking) in a later frame, as depicted in the row 1208.

FIG. 13 depicts a table with examples of results obtained using different memory management rules. The memory management rules include using only the first memory frame in a space-time memory read operation (F), using only the last frame in a space-time memory read operation (L), using both the first and last frames in a space-time memory read operation (FL), and using different values of N intermediate memory frames (e.g., N=3, 5, 10, 15, 20, 30). In this table T(s) shows the runtime in seconds per frame. The table depicts results in terms of the region similarity $\mathcal{J}$ and the contour accuracy $\mathcal{F}$.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A non-transitory computer-readable medium having program code stored thereon that, when executed by one or more processing devices, causes the one or more processing devices to perform operations comprising:

generating a query key map and a query value map by applying a space-time memory network to a query frame depicting a target feature, wherein a size of the query key map and a size of the query value map are determined according to a size of the query frame;

retrieving, from a memory, a memory key map and a memory value map that are computed from a set of memory frames from video content that includes the query frame;

computing memory weights by applying a similarity function to the memory key map and the query key map; and classifying, with the space-time memory network, content in the query frame as depicting the target feature based on a weighted summation that includes the memory weights applied to memory locations in the memory value map.

2. The non-transitory computer-readable medium of claim 1, wherein classifying the content in the query frame as depicting the target feature comprises generating a segmentation mask for a target object in the query frame, wherein a first memory frame has a first selection of the target feature that is computed based on (i) a user-specified selection of the target feature in a ground truth frame of the video content and (ii) a second selection of the target feature computed for a second memory frame, wherein the user-specified selection of the target feature comprises one or more user inputs identifying the target object in the ground truth frame, wherein generating the segmentation mask comprises:

computing an output value map from the weighted summation; and constructing the segmentation mask by decoding the output value map.

3. The non-transitory computer-readable medium of claim 2, wherein computing the output value map comprises concatenating the query value map with the weighted summation.

4. The non-transitory computer-readable medium of claim 1, wherein a first memory frame has a first selection of the target feature that is computed based on (i) a user-specified selection of the target feature in a ground truth frame of the video content and (ii) a second selection of the target feature computed for a second memory frame, wherein classifying the content in the query frame as depicting the target feature comprises generating a merged mask probability map indicating (i) first probabilities of pixels in the query frame being a target object and (ii) second probabilities of pixels in the query frame being a different target object, wherein generating the merged mask probability map comprises:

computing, from the weighted summation, a first mask probability map for the target object;

retrieving, from the memory, an additional memory key map and an additional memory value map that are computed, at least in part, using an additional user-specified selection of the different target object in the ground truth frame;

computing additional memory weights by applying the similarity function to the additional memory key map and the query key map;

computing, from an additional weighted summation that includes the additional memory weights applied to memory locations in the additional memory value map, a second mask probability map for the different target object; and merging the first mask probability map and the second mask probability map via a soft aggregation operation.

5. The non-transitory computer-readable medium of claim 2, wherein generating the query key map and the query value map comprises applying a query encoder and an embedding layer of the space-time memory network to features of the query frame, wherein applying the query encoder to features of the query frame comprises inputting, to the query encoder, the query frame without any segmentation mask; and wherein the operations further comprise generating the memory key map and the memory value map prior to the retrieving, wherein generating the memory key map and the memory value map comprises:

computing individual memory feature maps for the set of memory frames, respectively, wherein computing each individual memory feature map for a respective memory frame comprises:
(a) accessing the respective memory frame and a respective memory segmentation mask computed by the space-time memory network for the respective memory frame,
(b) generating a concatenated input by concatenating the respective memory frame and the respective memory segmentation mask,
(c) inputting the concatenated input to a memory encoder of the space-time memory network, and
(d) encoding, with the memory encoder, the concatenated input into the individual memory feature map,
embedding the individual memory feature maps into a set of individual memory key maps and a set of individual memory value maps, wherein each individual memory key map has a smaller dimension than a corresponding individual memory value map,
combining the set of individual memory key maps into the memory key map, and
combining the set of individual memory value maps into the memory value map.

6. The non-transitory computer-readable medium of claim 5, wherein combining the set of individual memory key maps into the memory key map comprises stacking the set of individual memory key maps along a temporal dimension in the set of individual memory key maps, wherein combining the set of individual memory value maps into the memory value map comprises stacking the set of individual memory value maps along a temporal dimension in the set of individual memory value maps.

7. The non-transitory computer-readable medium of claim 1, wherein the set of memory frames is a subset of an additional set of memory frames from the video content, wherein the operations further comprise:
identifying a hyperparameter value indicating a number of intermediate memory frames to be used for classifying the content in the query frame; and
selecting the set of memory frames based on the hyperparameter value.

8. The non-transitory computer-readable medium of claim 7, wherein the hyperparameter value indicates one or more of:
a semantic diversity of the set of memory frames; and
a semantic uniformity of the set of memory frames.

9. The non-transitory computer-readable medium of claim 1, wherein the query value map has a larger dimension than the query key map.

10. A system comprising:
one or more processing devices configured for executing a video processing engine; and
a non-transitory computer-readable medium implementing a space-time memory network comprising:
a query encoder and a query embedding layer configured for generating a query key map and a query value map from features of a query frame from video content, wherein a size of the query key map and a size of the query value map are determined according to a size of the query frame;
a memory encoder and a memory embedding layer configured for generating a memory key map and a memory value map from features of a set of memory frames from the video content; and
a memory read subnet configured for (i) computing memory weights by applying a similarity function to the memory key map and the query key map and (ii) classifying content in the query frame as depicting a target feature based on a weighted summation that includes the memory weights applied to memory locations in the memory value map.

11. The system of claim 10, wherein classifying content in the query frame as depicting the target feature comprises generating a segmentation mask for a target object in the query frame;
wherein the memory read subnet is further configured for concatenating the query value map with the weighted summation to generate an output value map; and
wherein the space-time memory network further comprises a decoder configured for decoding the output value map into the segmentation mask.

12. The system of claim 11, further comprising a memory device storing an initial space-time memory network, the initial space-time memory network having components including the query encoder, the query embedding layer, the memory encoder, the memory embedding layer, the memory read subnet, and the decoder;
wherein the one or more processing devices are configured for:
generating first training data by applying affine transforms to static images into image sets and annotating image sets generated by the affine transforms with segmentation masks;
accessing second training data comprising video data annotated with additional segmentation masks;
performing, with the first training data, a first training phase that jointly trains the components of the initial space-time memory network and thereby generates an interim space-time memory network, wherein the first training phase modifies one or more components of the initial space-time memory network; and
performing, with the second training data, a second training phase that jointly trains the components of the interim space-time memory network and thereby generates the space-time memory network, wherein the second training phase modifies one or more components of the interim space-time memory network.

13. The system of claim 11,
wherein the query encoder is configured to receive, as an input, the query frame without any segmentation mask,
wherein the memory encoder is configured for computing individual memory feature maps for the set of memory frames, respectively, wherein computing each individual memory feature map for a respective memory frame comprises:

receiving a concatenated input generated from a concatenation of the respective memory frame and a respective segmentation mask for the respective memory frame, encoding the concatenated input into the individual memory feature map, wherein the memory embedding layer is configured for embedding the individual memory feature maps into a set of individual memory key maps and a set of individual memory value maps, wherein each individual memory key map has a smaller dimension than a corresponding individual memory value map, wherein the space-time memory network further comprises one or more concatenation layers configured for combining the set of individual memory key maps into the memory key map and combining the set of individual memory value maps into the memory value map.

14. The system of claim 13, wherein combining the set of individual memory key maps into the memory key map comprises stacking the set of individual memory key maps along a temporal dimension in the set of individual memory key maps, wherein combining the set of individual memory value maps into the memory value map comprises stacking the set of individual memory value maps along a temporal dimension in the set of individual memory value maps.

15. The system of claim 14, wherein the query value map has a larger dimension than the query key map.

16. A method in which one or more processing devices perform operations comprising:

accessing, from video content, a query frame having content depicting a target feature; and performing a step for classifying content of the query frame as depicting the target feature by applying a space-time memory network to the query frame and one or more memory frames, a size of a query key map and a size of a query value map generated from the query frame are determined according to a size of the query frame.

17. The method of claim 16, wherein classifying the content in the query frame as depicting the target feature comprises generating a segmentation mask for a target object in the query frame.

18. The method of claim 16, wherein the one or more memory frames are a subset of an additional set of memory frames from the video content, wherein operations further comprise:

identifying a hyperparameter value indicating a number of intermediate memory frames to be used for classifying the content in the query frame; and selecting the one or more memory frames based on the hyperparameter value.

19. The method of claim 18, wherein the hyperparameter value indicates one or more of:

a semantic diversity of the one or more memory frames; and a semantic uniformity of the one or more memory frames.

20. The method of claim 16, wherein the step for classifying content of the query frame as depicting the target feature comprises a step for segmenting multiple target objects in the query frame.

* * * * *